(12) United States Patent
Honjo et al.

(10) Patent No.: US 8,374,496 B2
(45) Date of Patent: *Feb. 12, 2013

(54) CAMERA SYSTEM AND CAMERA BODY

(75) Inventors: Kenichi Honjo, Osaka (JP); Naoto Yumiki, Osaka (JP); Kazuhiko Ishimaru, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/405,953

(22) Filed: Feb. 27, 2012

(65) Prior Publication Data

US 2012/0154613 A1 Jun. 21, 2012

Related U.S. Application Data

(62) Division of application No. 12/374,629, filed as application No. PCT/JP2007/064313 on Jul. 20, 2007, now Pat. No. 8,155,512.

(30) Foreign Application Priority Data

Jul. 21, 2006 (JP) ................................. 2006-199184

(51) Int. Cl.
*G03B 17/00* (2006.01)
(52) U.S. Cl. ..................................... 396/55; 348/208.16
(58) Field of Classification Search .................... 396/52, 396/55; 348/208.16, 208.4
See application file for complete search history.

(56) References Cited

U.S. PATENT DOCUMENTS

| 5,463,443 | A | | 10/1995 | Tanaka et al. |
| 5,585,884 | A | | 12/1996 | Onuki |
| 5,615,397 | A | * | 3/1997 | Shiomi et al. .................... 396/55 |
| 5,740,471 | A | | 4/1998 | Terui |
| 6,983,107 | B2 | * | 1/2006 | Suzuki ............................ 396/55 |
| 7,106,960 | B2 | * | 9/2006 | Suzuki ............................ 396/55 |
| 8,040,381 | B2 | * | 10/2011 | Yumiki et al. ............. 348/208.5 |
| 2004/0202459 | A1 | | 10/2004 | Suzuki |
| 2005/0140793 | A1 | * | 6/2005 | Kojima et al. ........... 348/208.99 |
| 2007/0014551 | A1 | | 1/2007 | Fujisawa et al. |
| 2007/0019945 | A1 | | 1/2007 | Kurosawa |
| 2009/0160956 | A1 | * | 6/2009 | Yumiki et al. ........... 348/208.11 |

FOREIGN PATENT DOCUMENTS

| JP | 7-104338 A | 4/1995 |
| JP | 07-181535 A | 7/1995 |
| JP | 10-073860 A | 3/1998 |
| JP | 11-101998 A | 4/1999 |
| JP | 2002-107787 A | 4/2002 |
| JP | 2004-191647 A | 7/2004 |
| JP | 2004-309834 A | 11/2004 |
| JP | 2005-128092 A | 5/2005 |
| JP | 2005-189654 A | 7/2005 |
| JP | 2006-113443 A | 4/2006 |
| JP | 2006-126668 A | 5/2006 |
| JP | 2007-025298 A | 2/2007 |

OTHER PUBLICATIONS

International Search Report for PCT/JP2007/064313.

* cited by examiner

*Primary Examiner* — Clayton E Laballe
*Assistant Examiner* — Warren K Fenwick
(74) *Attorney, Agent, or Firm* — Pearne & Gordon LLP

(57) ABSTRACT

The camera system is constituted by the camera main body and the interchangeable lens, which is removably attachable to the camera main body. The camera main body has an imaging unit, a main body shake detector, a main body image blur corrector, and a body microcomputer configured to control the imaging unit, the shake detector, and the image blur corrector. The interchangeable lens has a shake detector, an image blur corrector, and a lens microcomputer configured to control the shake detector and the image blur corrector. The body microcomputer selects either the main body or lens shake detector, activates the selected shake detector, and stops the other shake detector.

3 Claims, 19 Drawing Sheets

(a) Sensitivity information held in nonvolatile memory on camera main body side

| Memory write information | Symbol | Unit | Address | Data |
|---|---|---|---|---|
| Shake detector, sensitivity (x direction) | Bθx | LSB/deg | 0x80 | 0x4000 |
| Shake detector, sensitivity (y direction) | Bθy | LSB/deg | 0x82 | 0x4000 |
| Shake detector, sensitivity (x direction) | Bωx | LSB/(deg/s) | 0x84 | 0x0100 |
| Shake detector, sensitivity (y direction) | Bωy | LSB/(deg/s) | 0x86 | 0x0100 |

(b) Information sent from camera main body side to interchangeable lens side

| Transfer information | Symbol | Unit | Address | Data |
|---|---|---|---|---|
| Shake detector, output signal (x direction) | θBx | LSB/deg | 0x90 | 0x0116 |
| Shake detector, output signal (y direction) | θBy | LSB/deg | 0x92 | 0x022D |
| Shake detector, output signal (x direction) | ωBx | LSB/(deg/s) | 0x94 | 0xFF85 |
| Shake detector, output signal (y direction) | ωBy | LSB/(deg/s) | 0x96 | 0xFF0A |
| Shake detector, state (camera side) | — | — | 0x98 | 0x03 |

Fig. 13

(a) Sensitivity information held in nonvolatile memory on interchangeable lens side

| Memory write information | Symbol | Unit | Address | Data |
|---|---|---|---|---|
| Shake detector, sensitivity (x direction) | Lθx | LSB/deg | 0x00 | 0x8000 |
| Shake detector, sensitivity (y direction) | Lθy | LSB/deg | 0x02 | 0x8000 |
| Shake detector, sensitivity (x direction) | Lωx | LSB/(deg/s) | 0x04 | 0x0200 |
| Shake detector, sensitivity (y direction) | Lωy | LSB/(deg/s) | 0x06 | 0x0200 |

(b) Information sent from interchangeable lens side to camera main body side

| Transfer information | Symbol | Unit | Address | Data |
|---|---|---|---|---|
| Shake detector, output signal (x direction) | θLx | LSB/deg | 0x10 | 0x022D |
| Shake detector, output signal (y direction) | θLy | LSB/deg | 0x12 | 0x045A |
| Shake detector, output signal (x direction) | ωLx | LSB/(deg/s) | 0x14 | 0xFF0A |
| Shake detector, output signal (y direction) | ωLy | LSB/(deg/s) | 0x16 | 0xFE14 |
| Shake detector, state (lens side) | — | — | 0x18 | 0x03 |

Fig. 14

Hand shake data
(a)
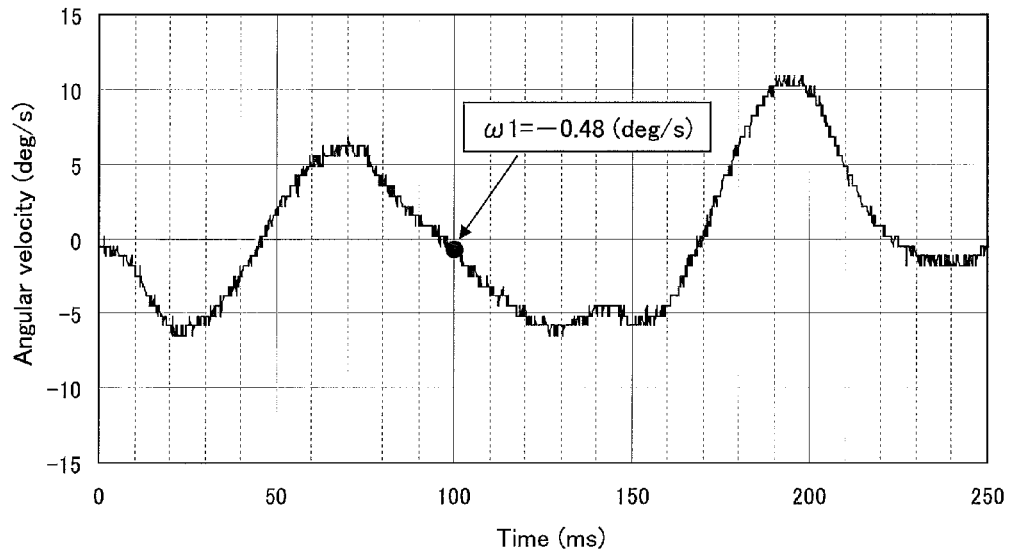
(b)
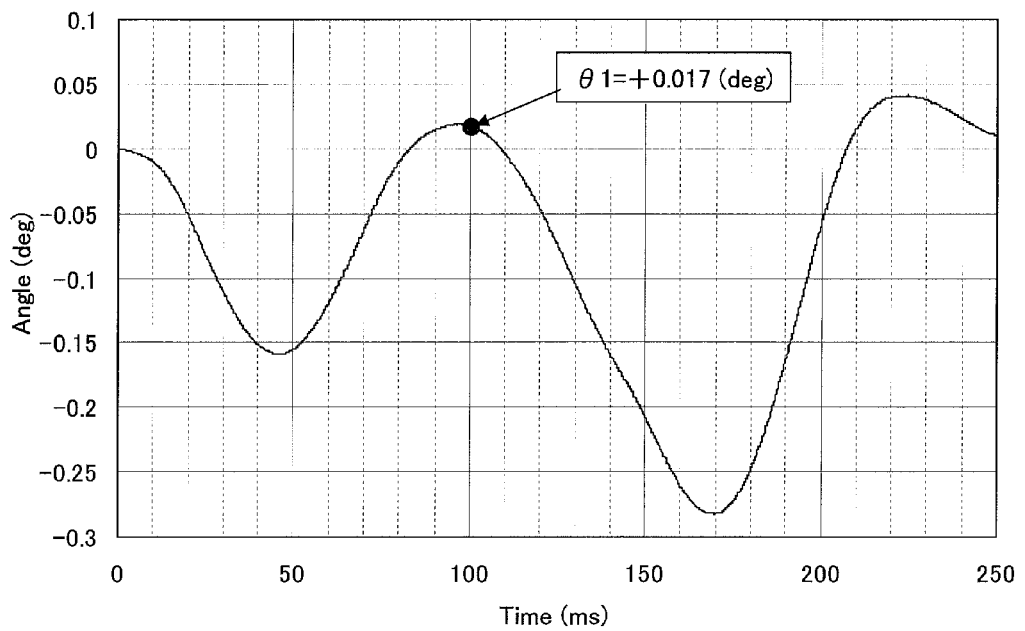
Fig. 15

CAMERA SYSTEM AND CAMERA BODY

CROSS-REFERENCE TO RELATED APPLICATIONS

This application is a division of U.S. patent application Ser. No. 12/374,629 filed Jan. 21, 2009 which is incorporated herein by reference in its entirety.

BACKGROUND OF THE INVENTION

1. Field of the Invention

The present invention relates to a camera system and a method for controlling the same, and more particularly relates to a camera system for a single-reflex digital camera with image blur correctors built into an interchangeable lens and the camera main body, and to a method for controlling this system.

2. Description of the Related Art

Single-reflex digital cameras with which an optical image of a subject is converted into an electrical image signal and can be outputted are rapidly growing in popularity. With a single-reflex digital camera such as this, the camera system is made up of a camera main body and an interchangeable lens that is removably mounted on the camera main body. With this camera system, the camera main body has the basic function of forming images of subjects, and the interchangeable lens has the optical function of constituting part of the imaging optical system.

With this single-reflex digital camera, when the user looks at a subject through the viewfinder, the light that is incident on the interchangeable lens (that is, the subject image) is reflected by a reflecting mirror disposed along the optical path to the rear of the interchangeable lens, and is incident on a pentaprism. As a result, the subject image is converted by the pentaprism into an erect image, and the user can see the subject image through the optical viewfinder.

Also, with this single-reflex digital camera, since a plurality of interchangeable lenses of different focal length can be mounted on a single camera main body, the user can photograph a wide variety of scenes using the interchangeable lens best suited to each scene.

Meanwhile, there has been a proposal for standards for a single-reflex camera system in which the communication system between the camera main body and the interchangeable lens, the lens mount, and so forth are standardized in order to make such products more convenient to use. This would make these products interchangeable as long as the camera main body and interchangeable lens met the standards, so a user could combine camera main bodies and interchangeable lenses made by different manufacturers.

Thus, these single-reflex digital cameras have become a system that is extremely convenient to use, which means that as these single-reflex digital cameras become more popular, they can be used not only by the professionals and experienced amateurs who used them in the past, but also by beginners and so forth.

Nevertheless, even with a single-reflex digital camera, just as with ordinary digital cameras, hand shake often adversely affects the resulting photographic image. Therefore, as the number of pixels increases in the imaging sensors built into the camera main body, and as the enlarged printing of these photographic images becomes more prevalent, the effect of hand shake becomes more pronounced. The effect of hand shake is even more pronounced when the camera is used by a novice.

In view of this, a camera system has been proposed for a single-reflex digital camera, in which an optical image blur correction device for adjusting the optical path and thereby correcting image blur caused by hand shake is built into an interchangeable lens (see Japanese Laid-Open Patent Application H10-73860, for example).

SUMMARY OF THE INVENTION

On the other hand, one image blur correction device other than an optical type that has been proposed is a sensor shift type image blur correction device, which shifts imaging sensors according to hand shake. There is less deterioration in optical performance with this sensor shift type image blur correction device than with an optical type. Therefore, it is conceivable that a sensor shift type image blur correction device will be installed in the camera main body of a single-reflex digital camera.

However, if image blur correction devices are built into a camera main body and an interchangeable lens, when the interchangeable lens is connected to the camera main body, the two image blur correction devices will operate at the same time and the image blur correction operation cannot be performed properly. Also, it may be impossible to communicate properly between an interchangeable lens and a camera main body made by different manufacturers.

An aspect of the present invention provides a camera system that operates image blur correction devices properly when image blur correction devices are built into a camera main body and an interchangeable lens, and to provide a method for controlling a camera system, an interchangeable lens, a camera main body.

A camera system according to one aspect is a camera system for forming an image of a subject, including a camera main body and an interchangeable lens arranged to be removably attachable to the camera main body. The camera main body has an imaging unit configured to form an image of a subject, a main body shake detector configured to detect shake of the camera system, a main body image blur corrector configured to correct image blur produced by the shake, and a main body controller configured to control the imaging unit and the main body shake detector. The interchangeable lens has a lens shake detector configured to detect shake, a lens image blur corrector configured to correct image blur produced by the shake, and a lens controller electrically connected to the main body controller and configured to control the lens shake detector. The main body controller has a selector configured to select either combination of the main body image blur corrector and the lens shake detector or combination of the lens image blur corrector and the main body shake detector, and a switching part configured to activate the selected image blur corrector and shake detector.

A camera system according to yet another aspect is a camera system for forming an image of a subject, including a camera main body and an interchangeable lens arranged to be removably attachable to the camera main body. The camera main body has an imaging unit configured to form an image of the subject, a main body shake detector configured to detect shake of the camera system, and a main body controller configured to control the imaging unit and the main body shake detector. The interchangeable lens has a lens shake detector configured to detect the shake, and a lens controller electrically connected to the main body controller and configured to control the lens shake detector. The camera main body and/or the interchangeable lens further having an image blur corrector configured to correct image blur produced by the shake. The main body controller having a selector configured to select the lens shake detector when only the camera main body has an image blur corrector and configured to select the main body shake detector when only the interchangeable lens has an image blur corrector, and a switching part configured to activate the selected shake detector.

A camera system according to still another aspect is a camera system for forming an image of a subject, including a camera main body and an interchangeable lens arranged to be removably attachable to the camera main body. The camera main body has an imaging unit configured to form an image of the subject, a main body image blur corrector configured to correct image blur produced by shake of the camera system, and a main body controller configured to control the imaging unit and the main body image blur corrector. The interchangeable lens has a lens image blur corrector configured to correct image blur produced by the shake, and a lens controller electrically connected to the main body controller and configured to control the lens image blur corrector. The camera main body and/or the interchangeable lens further having a shake detector configured to detect the shake. The main body controller has a selector configured to select the lens image blur corrector when only the camera main body has the shake detector and configured to select the main body image blur corrector when only the interchangeable lens has the shake detector, and a switching part configured to activate the selected image blur corrector.

A camera main body according to yet a further aspect to which an interchangeable lens is removably attachable, constituting, along with the interchangeable lens, a camera system for forming an image of a subject. The interchangeable lens has a lens shake detector configured to detect shake of the camera system, a lens image blur corrector configured to correct image blur produced by the shake, and a lens controller configured to control the detecting operation of the lens shake detector. The camera main body includes an imaging unit, a main body shake detector, a main body image blur. The imaging unit is configured to form an image of the subject. The main body shake detector is configured to detect shake of the camera system. The main body image blur is configured to correct image blur produced by the shake. The main body controller is configured to control the imaging operation of the imaging unit and the detecting operation of the main body shake detector. The main body controller is electrically connected to the lens controller, and has a selector configured to select combination of the main body image blur corrector and the lens shake detector or combination of the lens image blur corrector and the main body shake detector, and a switching part configured to activate the selected image blur corrector and shake detector.

BRIEF DESCRIPTION OF THE DRAWINGS

FIGS. 13A and 13B are examples of sensitivity information and transfer information held in the nonvolatile memory on the camera main body side;

FIGS. 14A and 14B are examples of sensitivity information and transfer information held in the nonvolatile memory on the interchangeable lens side;

FIGS. 15A and 15B are examples of hand shake data waveform diagrams for the camera main body and the interchangeable lens;

DETAILED DESCRIPTION OF THE PREFERRED EMBODIMENTS

Figure 1:
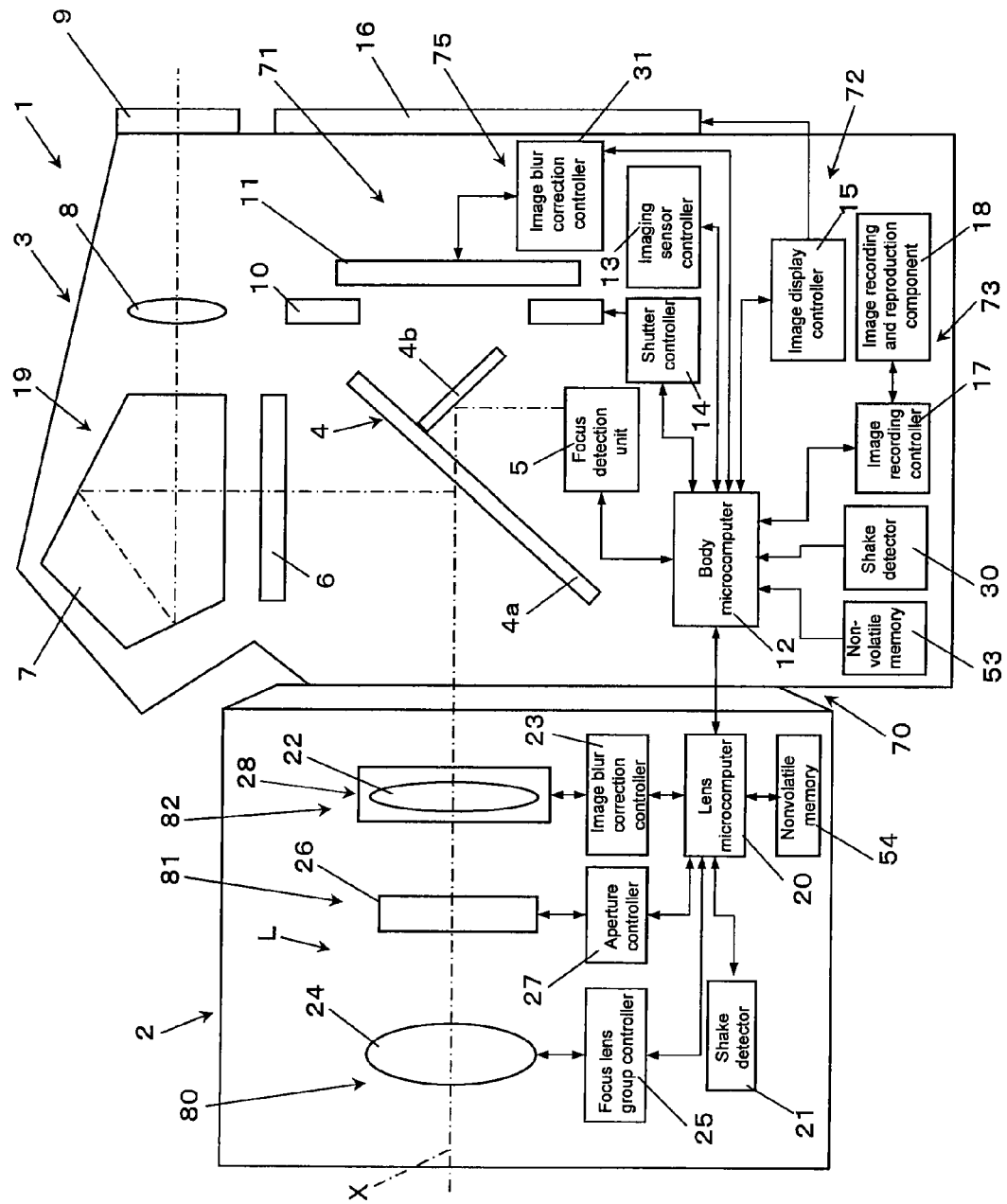
FIG. 1 is a block diagram of an interchangeable lens and camera main body control system according to a first embodiment of the present invention.

The camera system according to a first aspect of the present invention is a camera system for forming an image of a subject, comprising a camera main body and an interchangeable lens that is removably attachable to the camera main body. The camera main body has an imaging unit for forming an image of a subject, a main body shake detector for detecting shake of the camera system, and a main body controller for controlling the imaging operation of the imaging unit and also controlling the detecting operation of the main body shake detector. The interchangeable lens has a lens shake detector for detecting shake, and a lens controller for controlling the detecting operation of the lens shake detector. The camera main body and/or the interchangeable lens further has an image blur corrector for correcting image blur produced by the shake. The main body controller is capable of sending and receiving information to and from the lens controller, and has a selector for selecting either the main body shake detector or the lens shake detector, and a switching component for activating the selected shake detector and stopping the other shake detector.

With this camera system, the switching component activates one of the shake detectors and stops the other one.

Specifically, shake detection is carried by only one of the shake detectors. As a result, even when a shake detector is installed in both the camera main body and the interchangeable lens, the image blur correctors can be operated properly according to the amount of shake detected by the shake detectors.

The camera system according to a second aspect of the present invention is the camera system of the first aspect, wherein the camera main body and the interchangeable lens further have main body and lens image blur correctors as the image blur corrector. The selector selects either the main body or the lens image blur corrector. The switching component sets the selected image blur corrector to a correction-possible state, and sets the other image blur corrector to a correction-impossible state.

With this camera system, the switching component sets one of the image blur correctors to a correction-possible state, and sets the other image blur corrector to a correction-impossible state. Specifically, correction is carried out by only one of the image blur correctors. As a result, even when an image blur corrector is installed in both the camera main body and the interchangeable lens, the image blur correctors can be operated properly.

The term "correction-possible state" as used here means a state in which an image blur corrector can perform its correction operation. The term "correction-impossible state" means a state in which an image blur corrector cannot perform its correction operation, and "correction-impossible state" encompasses, for example, a state in which the correcting lens of an image blur corrector is mechanically fixed in its middle position, or a state in which the correcting lens is electrically supported in its middle position.

The camera system according to a third aspect of the present invention is the camera system of the second aspect, wherein the selector selects the lens image blur corrector when the main body shake detector is selected, and selects the main body image blur corrector when the lens shake detector is selected.

The camera system according to a fourth aspect of the present invention is the camera system of the third aspect, wherein the main body controller holds main body information pertaining to the camera main body, the lens controller holds lens information pertaining to the interchangeable lens. The selector selects either the main body or the lens image blur corrector on the basis of the main body information and lens information.

As a result, the shake detector can be selected according to the specifications of the shake detector, etc., and the image blur correction performance of the camera system can be utilized to its full potential.

The camera system according to a fifth aspect of the present invention is the camera system of the fourth aspect wherein the main body information includes main body specifying information for specifying the camera main body, and the lens information includes lens specifying information for specifying the interchangeable lens. The selector selects either the main body or lens shake detector on the basis of the main body specifying information and lens specifying information.

In this case, for example, the newer model of shake detector can be used, and the image blur correction performance of the image blur correction device can be utilized to its full potential.

The term "model" here means information that allows the hardware or software configuration to be identified, examples of which include the date of manufacture, the model number, the version, and firmware updates.

The camera system according to a sixth aspect of the present invention is the camera system of the fourth aspect, wherein the main body information includes main body-side detection performance information pertaining to the detection performance of the main body shake detector. The lens information includes lens-side detection performance information according to the detection performance of the lens shake detector. The selector selects either the main body or lens shake detector on the basis of the main body-side and lens-side detection performance information.

In this case, for example, a shake detector of higher detection performance can be used, and the image blur correction performance of the camera system can be utilized to its full potential.

An example of the "detection performance" here is the sensitivity of the shake detector.

The camera system according to a seventh aspect of the present invention is the camera system of the fourth aspect, wherein the main body information includes main body-side power consumption information pertaining to the power consumption of the main body shake detector, and the lens information includes lens-side power consumption information pertaining to the power consumption of the lens shake detector. The selector selects either the main body or lens shake detector on the basis of the main body-side and lens-side power consumption information.

With this camera system, the shake detector is selected on the basis of power consumption. Therefore, for example, a shake detector with lower power consumption can be used, and the power consumption of the overall camera system can be reduced.

The camera system according to an eighth aspect of the present invention is the camera system of the fourth aspect, wherein, when it is determined from the main body information and lens information that the main body and lens shake detector specifications are the same, the selector selects the main body or lens shake detector that has been predetermined in the main body controller, and when it is determined that the main body and lens image blur corrector specifications are the same, the selector selects the main body or lens image blur corrector that has been predetermined in the main body controller.

As a result, even when the specifications are the same, image blur correction is carried out by only one shake detector and image blur corrector.

The camera system according to a ninth aspect of the present invention is the camera system of the fourth aspect, wherein the main body information includes main body-side sensitivity information pertaining to the sensitivity of the main body shake detector, and the lens information includes lens-side sensitivity information pertaining to the sensitivity of the lens shake detector. The main body controller further has a converter for converting the output from the main body shake detector into output corresponding to the output from the lens shake detector on the basis of the main body and lens sensitivity information.

With this camera system, the image blur corrector can be operated properly when the lens shake detector is used to perform image blur correction with the main body image blur corrector, or when the main body shake detector is used to perform image blur correction with the lens image blur corrector.

The camera system according to a tenth aspect of the present invention is the camera system of the second aspect, wherein the selector selects the lens shake detector when the main body image blur corrector is selected, and selects the main body shake detector when the lens image blur corrector is selected.

The camera system according to an eleventh aspect of the present invention is the camera system of the tenth aspect, wherein the main body controller holds main body information pertaining to the camera main body, the lens controller holds lens information pertaining to the interchangeable lens. The selector selects either the main body or lens image blur corrector on the basis of the main body information and lens information.

As a result, the image blur corrector can be selected according to the specifications of the image blur corrector, etc., and the image blur correction performance of the camera system can be utilized to its full potential.

The camera system according to a twelfth aspect of the present invention is the camera system of the eleventh aspect, wherein the main body information includes main body specifying information for specifying the model of the camera main body, and the lens information includes lens specifying information for specifying the model of the interchangeable lens. The selector selects either the main body or lens image blur corrector on the basis of the main body specifying information and lens specifying information.

In this case, for example, the newer model of image blur corrector can be used, and the image blur correction performance of the camera system can be utilized to its full potential.

The term "model" here means information that allows the hardware or software configuration to be identified, examples of which include the date of manufacture, the model number, the version, and firmware updates.

The camera system according to a thirteenth aspect of the present invention is the camera system of the eleventh aspect, wherein the main body information includes main body-side correction performance information pertaining to the correction performance of the main body image blur corrector, and the lens information includes lens-side correction performance information pertaining to the correction performance of the lens image blur corrector. The selector selects either the main body or lens image blur corrector on the basis of the main body-side and lens-side correction performance information.

In this case, for example, an image blur corrector of higher correction performance can be used, and the image blur correction performance of the camera system can be utilized to its full potential.

An example of the "correction performance" here is the maximum possible correction angle determined from an optical system such as a correcting lens.

The camera system according to a fourteenth aspect of the present invention is the camera system of the eleventh aspect, wherein the main body information includes main body-side power consumption information pertaining to the power consumption of the main body image blur corrector, and the lens information includes lens-side power consumption information pertaining to the power consumption of the lens image blur corrector. The selector selects either the main body or lens image blur corrector on the basis of the main body-side and lens-side power consumption information.

With this camera system, the image blur corrector is selected on the basis of power consumption. Therefore, for example, an image blur corrector with lower power consumption can be used, and the power consumption of the overall camera system can be reduced.

The camera system according to a fifteenth aspect of the present invention is the camera system of the eleventh aspect, wherein the main body information includes main body-side drive style information pertaining to the drive style of the main body image blur corrector, and the lens information includes lens-side drive style information pertaining to the drive style of the lens image blur corrector. The selector selects either the main body or lens image blur corrector on the basis of the main body-side and lens-side drive style information.

In this case, the image blur corrector is selected on the basis of the drive style of the image blur corrector. For instance, when a piezoelectric actuator is used in the image blur corrector, because piezoelectric actuators operate very quietly, such an image blur corrector is suited to a photography mode that requires silent operation. Therefore, the optimal image blur corrector for this photography mode can be used by selecting an image blur corrector that makes use of a piezoelectric actuator.

The camera system according to a sixteenth aspect of the present invention is the camera system of the third aspect, wherein the main body controller further has a detector for detecting that the interchangeable lens has been mounted in the camera main body. After detection by the detector, the selector selects either the main body or lens shake detector, and selects either the main body or the lens image blur corrector.

The camera system according to a seventeenth aspect of the present invention is the camera system of the fourth aspect, wherein the main body information includes at least one of the following: main body specifying information for specifying the model of the camera main body, main body-side detection performance information pertaining to the detection performance of the main body shake detector, main body-side correction performance information according to the correction performance of the main body image blur corrector, main body-side power consumption information pertaining to the power consumption of the main body shake detector and image blur corrector, and main body-side drive style information pertaining to the drive style of the main body image blur corrector.

The camera system according to an eighteenth aspect of the present invention is the camera system of the fourth aspect, wherein the lens information includes at least one of the following: lens specifying information for specifying the model of the interchangeable lens, lens-side detection performance information pertaining to the detection performance of the lens shake detector, lens-side correction performance information pertaining to the correction performance of the lens image blur corrector, lens-side power consumption information pertaining to the power consumption of the lens shake detector and image blur corrector, and lens-side drive style information pertaining to the drive style of the lens image blur corrector.

The camera system according to a nineteenth aspect of the present invention is the camera system of the fourth aspect, wherein the main body controller further has information is held in a main body nonvolatile recording medium that holds the main body information, and the lens controller further has information is held in a lens nonvolatile recording medium that holds the lens information.

The camera system according to a twentieth aspect of the present invention is the camera system of the third aspect, wherein the main body controller or interchangeable lens further has a detection selector with which either the main body or lens shake detector can be selected from the outside. The selector selects either the main body or lens shake detector on the basis of the selection state of the detection selector.

In this case, the user can use the detection selector to select from the outside the shake detector to be used.

The camera system according to a twenty-first aspect of the present invention is the camera system of the third aspect, wherein the camera main body further has a main body detection selector with which the activation and stopping of the main body shake detector can be selected from the outside. When activate is selected by the main body detection selector, the selector selects the main body shake detector. When stop is selected by the main body detection selector, the selector selects the lens shake detector.

In this case, the user can use the main body detection selector to select from the outside the shake detector to be used.

The camera system according to a twenty-second aspect of the present invention is the camera system of the third aspect, wherein the interchangeable lens further has a lens detection selector with which the activation and stopping of the lens shake detector can be selected from the outside. When activate is selected by the lens detection selector, the selector selects the lens shake detector. When stop is selected by the lens detection selector, the selector selects the main body shake detector.

In this case, the user can use the lens detection selector to select from the outside the shake detector to be used.

The camera system according to a twenty-third aspect of the present invention is the camera system of the tenth aspect, wherein the camera main body or interchangeable lens further has a correction selector with which either the main body or lens image blur corrector can be selected from the outside. The selector selects either the main body or lens image blur corrector on the basis of the selection state of the correction selector.

In this case, the user can use the correction selector to select from the outside the image blur corrector to be used.

The camera system according to a twenty-fourth aspect of the present invention is the camera system of the tenth aspect, wherein the camera main body further has a main body correction selector with which the activation and stopping of the main body image blur corrector can be selected from the outside. When activate is selected by the main body correction selector, the selector selects the main body image blur corrector. When stop is selected by the main body correction selector, the selector selects the lens image blur corrector.

In this case, the user can use the main body correction selector to select from the outside the image blur corrector to be used.

The camera system according to a twenty-fifth aspect of the present invention is the camera system of the tenth aspect, wherein the interchangeable lens further has a lens correction selector with which the activation and stopping of the lens image blur corrector can be selected from the outside. When activate is selected by the lens correction selector, the selector selects the lens image blur corrector. When stop is selected by the lens correction selector, the selector selects the main body image blur corrector.

In this case, the user can use the lens correction selector to select from the outside the image blur corrector to be used.

The camera system according to a twenty-sixth aspect of the present invention is the camera system of the third aspect, wherein the selector selects the shake detector that has been preset.

The camera system according to a twenty-seventh aspect of the present invention is the camera system of the third aspect, wherein the selector selects the image blur corrector that has been preset.

The camera system according to a twenty-eighth aspect of the present invention is the camera system of the first aspect, wherein the selector selects the image blur corrector and selects the lens shake detector when only the camera main body has an image blur corrector, and selects the image blur corrector and selects the main body shake detector when only the interchangeable lens has an image blur corrector.

The camera system according to a twenty-ninth aspect of the present invention is a camera system for forming an image of a subject, comprising a camera main body and an interchangeable lens that is removably attachable to the camera main body. The camera main body has an imaging unit for forming an image of the subject, a main body image blur corrector for correcting image blur produced by shake of the camera system, and a main body controller for controlling the imaging operation of the imaging unit and also controlling the correcting operation of the main body image blur corrector. The interchangeable lens has a lens image blur corrector for correcting image blur, and a lens controller for controlling the correcting operation of the lens image blur corrector. The camera main body and/or the interchangeable lens further has a shake detector for detecting shake. The main body controller is capable of sending and receiving information to and from the lens controller, and has a selector for selecting either the main body or lens image blur corrector, and a switching component for setting the selected image blur corrector to a correction-possible state, and setting the other image blur corrector to a correction-impossible state.

With this camera system, the switching component sets one of the image blur correctors to a correction-possible state, and sets the other image blur corrector to a correction-impossible state. Specifically, correction is carried out by only one of the image blur correctors. As a result, even when an image blur corrector is installed in both the camera main body and the interchangeable lens, the image blur correctors can be operated properly.

The term "correction-possible state" as used here means a state in which an image blur corrector can perform its correction operation. The term "correction-impossible state" means a state in which an image blur corrector cannot perform its correction operation, and "correction-impossible state" encompasses, for example, a state in which the correcting lens of an image blur corrector is mechanically fixed in its middle position, or a state in which the correcting lens is electrically supported in its middle position.

The camera system according to a thirtieth aspect of the present invention is the camera system of the twenty-ninth aspect, wherein the selector selects the shake detector and selects the lens image blur corrector when only the camera main body has a shake detector, and selects the shake detector and selects the main body image blur corrector when only the interchangeable lens has a shake detector.

The camera main body according to a thirty-first aspect of the present invention constitutes, along with the interchangeable lens, a camera system for forming an image of a subject, and an interchangeable lens is removably attachable. The interchangeable lens has a lens shake detector for detecting shake of the camera system, and a lens controller for controlling the detecting operation of the lens shake detector. This camera main body includes an imaging unit for forming an image of the subject, a main body shake detector for detecting shake of the camera system, and a main body controller for controlling the imaging operation of the imaging unit and also controlling the detecting operation of the main body shake detector. The main body controller is capable of sending and receiving information to and from the lens controller, and has a selector for selecting either the main body shake detector or the lens shake detector, and a switching component for activating the selected shake detector and stopping the other shake detector.

With this camera main body, the switching component activates one shake detector and stops the other. Specifically, shake detection is carried out by only one of the shake detectors. As a result, even when shake detectors are installed in both the camera main body and the interchangeable lens, the image blur correctors can be operated properly according to the amount of shake detected by the shake detectors.

The camera main body according to a thirty-second aspect of the present invention is the camera main body of the thirty-first aspect, wherein the camera main body and the interchangeable lens further have main body and lens image blur correctors as the image blur corrector. The selector selects either the main body or the lens image blur corrector. The switching component sets the selected image blur corrector to a correction-possible state, and sets the other image blur corrector to a correction-impossible state.

With this camera main body, the switching component sets one of the image blur correctors to a correction-possible state, and sets the other image blur corrector to a correction-impossible state. Specifically, correction is carried out by only one of the image blur correctors. As a result, even when an image blur corrector is installed in both the camera main body and the interchangeable lens, the image blur correctors can be operated properly.

The camera system main body according to a thirty-third aspect of the present invention is the camera system main body of the thirty-second aspect, wherein the selector selects the lens image blur corrector when the main body shake detector is selected, and selects the main body image blur corrector when the lens shake detector is selected.

The camera main body according to a thirty-fourth aspect of the present invention is the camera main body of the thirty-third aspect, wherein the main body controller holds main body information pertaining to the camera main body, and the lens controller holds lens information pertaining to the interchangeable lens. The selector selects either the main body or the lens shake detector image blur corrector on the basis of the main body information and lens information.

The camera main body according to a thirty-fifth aspect of the present invention is the camera main body of the thirty-first aspect, wherein the main body controller holds main body information according to the camera main body, and the lens controller holds lens information according to the interchangeable lens. The selector selects either the main body or the lens shake detector and selects either the main body or the lens image blur corrector on the basis of main body and lens information.

The camera main body according to a thirty-sixth aspect of the present invention is the camera main body of the thirty-fifth aspect, wherein the main body controller holds main body information according to the camera main body, and the lens controller holds lens information according to the interchangeable lens. The selector selects either the main body or the lens image blur corrector on the basis of main body or lens information.

The interchangeable lens according to a thirty-seventh aspect of the present invention constitutes, along with a camera main body, a camera system for forming an image of a subject, and is removably attachable to the camera main body, which has a main body controller. This interchangeable lens includes a lens shake detector for detecting shake of the camera system, a lens image blur corrector for correcting image blur produced by shake of the camera system, and a lens controller for controlling the detecting operation of the lens shake detector and controlling the correcting operation of the image blur corrector. The lens controller is capable of sending and receiving information to and from the main body controller, activates the lens shake detector and sets the image blur corrector to a correction-impossible state on the basis of a first signal from the main body controller, and stops the lens shake detector and sets the image blur corrector to a correction-impossible state on the basis of a second signal from the main body controller.

With this interchangeable lens, the lens controller switches between the activation and stopping of the lens shake detector and switches between the correction-possible state and correction-impossible state of the image blur corrector on the basis of signals from the main body controller. As a result, the image blur correction devices can be operated properly even when, for example, shake detectors and image blur correctors are installed in both the camera main body and the interchangeable lens. Also, with this interchangeable lens, the lens shake detector and image blur corrector can be used in combination with the shake detector or image blur corrector on the camera main body side, and the image blur correction effect of the camera system as a whole can be enhanced.

The term "correction-possible state" as used here means a state in which an image blur corrector can perform its correction operation. The term "correction-impossible state" means a state in which an image blur corrector cannot perform its correction operation, and "correction-impossible state" encompasses, for example, a state in which the correcting lens of an image blur corrector is mechanically fixed in its middle position, or a state in which the correcting lens is electrically supported in its middle position.

The interchangeable lens according to a thirty-eighth aspect of the present invention is the interchangeable lens of the thirty-seventh aspect, wherein the lens controller holds lens information according to the interchangeable lens, and the lens information can be sent according to a command from the main body controller.

The interchangeable lens according to a thirty-ninth aspect of the present invention is the interchangeable lens of the thirty-eighth aspect, wherein the lens information includes at least one of the following: lens specifying information for specifying the model of the interchangeable lens, lens-side detection performance information pertaining to the detection performance of the lens shake detector, lens-side correction performance information pertaining to the correction performance of the lens image blur corrector, lens-side power consumption information pertaining to the power consumption of the lens shake detector and image blur corrector, and lens-side drive style information pertaining to the drive style of the lens image blur corrector.

The method for controlling a camera system according to a fortieth invention is method for controlling a camera system for forming an image of a subject, said camera system comprising a camera main body and an interchangeable lens that is removably attachable to the camera main body. The camera main body has an imaging unit for forming an image of a subject, a main body shake detector for detecting shake of the camera system, and a main body controller for controlling the imaging operation of the imaging unit and controlling the detecting operation of the main body shake detector. The interchangeable lens has a lens shake detector for detecting shake, and a lens controller for controlling the detecting operation of the lens shake detector. The main body controller is capable of sending and receiving information to and from the lens controller. The camera main body and/or the interchangeable lens further has an image blur corrector for correcting image blur produced by shake. This control method includes a selection step in which the main body controller selects either the main body or lens shake detector; and a switching step in which the main body controller activates the shake detector selected in the selection step, and stops the other shake detector.

With this control method, one of the shake detectors is activated and the other is stopped in the selection step and the switching step. Specifically, shake detection is carried by only one of the shake detectors. As a result, even when shake detectors are installed in both the camera main body and the interchangeable lens, the image blur correctors can be operated properly according to the amount of shake detected by the shake detectors.

The method for controlling a camera system according to a forty-first aspect of the present invention is the method for controlling a camera system of the fortieth aspect, wherein the camera main body and the interchangeable lens further have main body and lens image blur correctors as the image blur corrector. In the selection step, the main body controller selects either the main body or the lens image blur corrector. In the switching step, the selected image blur corrector is set to a correction-possible state, and the other image blur corrector is set to a correction-impossible state.

With this control method, one of the image blur correctors is activated and the other is stopped in the selection step and the switching step. Specifically, correction is carried out by only one of the image blur correctors. As a result, even when an image blur corrector is installed in both the camera main body and the interchangeable lens, the image blur correctors can be operated properly.

The term "correction-possible state" as used here means a state in which an image blur corrector can perform its correction operation. The term "correction-impossible state" means a state in which an image blur corrector cannot perform its correction operation, and "correction-impossible state" encompasses, for example, a state in which the correcting lens of an image blur corrector is mechanically fixed in its middle position, or a state in which the correcting lens is electrically supported in its middle position.

The camera system method for controlling a camera system according to a forty-second aspect of the present invention is the camera system method for controlling a camera system of the forty-first aspect, wherein, in the selection step, the main body controller selects the lens image blur corrector when the main body shake detector is selected by the main body controller, and the main body controller selects the main body image blur corrector when the lens shake detector is selected by the main body controller.

The method for controlling a camera system according to a forty-third aspect of the present invention is the method for controlling a camera system of the forty-second aspect, wherein the main body controller holds main body information pertaining to the camera main body, and the lens controller holds lens information pertaining to the interchangeable lens. In the selection step, either the main body or lens shake detector is selected on the basis of the main body information and lens information.

As a result, the shake detector can be selected according to the specifications of the shake detector, etc., and the performance of the image blur correction devices can be utilized to its full potential.

The method for controlling a camera system according to a forty-fourth aspect of the present invention is the method for controlling a camera system of the forty-first aspect, wherein, in the selection step, the main body controller selects the lens image blur corrector when the main body shake detector is selected by the main body controller, and the main body controller selects the main body image blur corrector when the lens shake detector is selected by the main body the main body controller holds main body information pertaining to the camera main body, and the lens controller holds lens information pertaining to the interchangeable lens. In the selection step, either the main body or lens shake detector is selected and either the main body or lens image blur corrector is selected on the basis of the main body information and lens information.

As a result, the shake detector and image blur corrector can be selected according to the specifications of the shake detector and image blur corrector, etc., and the performance of the image blur correction devices can be utilized to its full potential.

The method for controlling a camera system according to a forty-fifth aspect of the present invention is the method for controlling a camera system of the forty-fourth aspect, wherein the main body controller holds main body information pertaining to the camera main body, and the lens controller holds lens information pertaining to the interchangeable lens. In the selection step, either the main body or lens image blur corrector is selected on the basis of the main body information and lens information.

As a result, the image blur corrector can be selected according to the specifications of the image blur corrector, etc., and the performance of the image blur correction devices can be utilized to its full potential.

Embodiments of the present invention will now be described through reference to the drawings.

First Embodiment

1: Overall Configuration of Camera System

Figure 2:
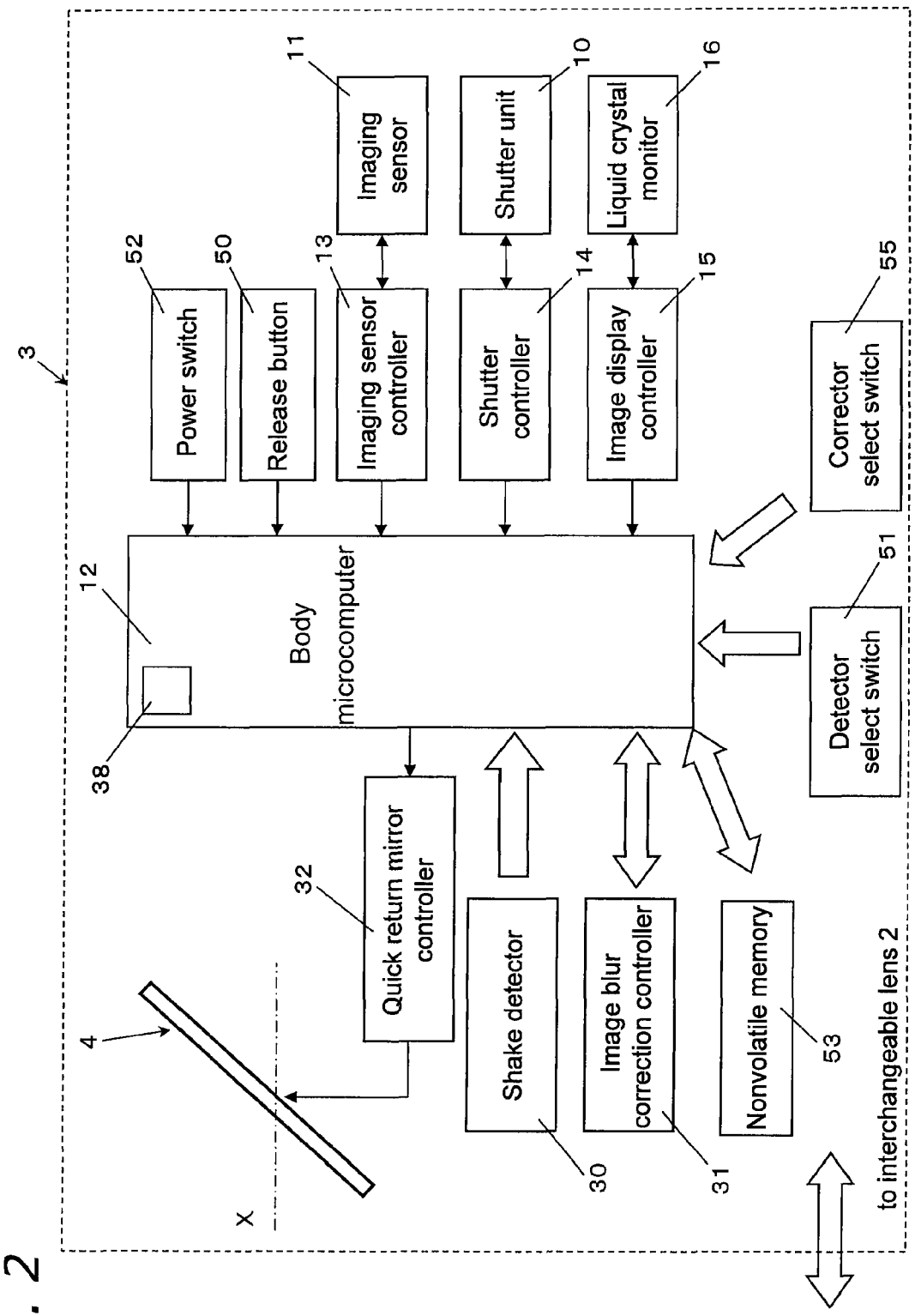
FIG. 2 is a block diagram of control system inside a camera main body according to the first embodiment of the present invention.
Figure 3:
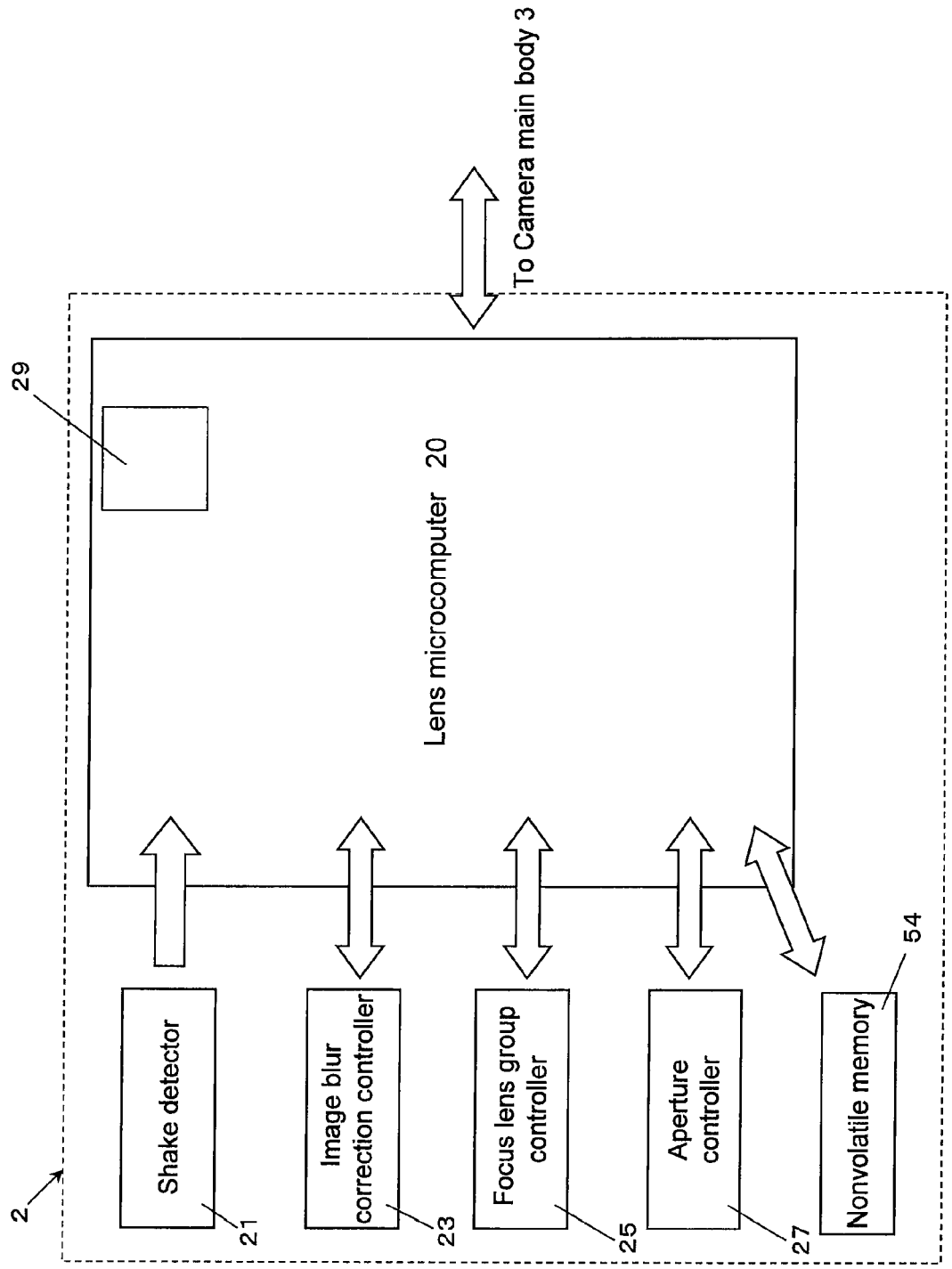
FIG. 3 is a block diagram of control system inside an interchangeable lens according to the first embodiment of the present invention.

The camera system according to the first embodiment of the present invention will be described through reference to FIGS. 1 to 3. FIG. 1 is a diagram of the overall configuration of the camera system according to the first embodiment of the present invention, FIG. 2 is a simplified diagram of the configuration of the camera main body, and FIG. 3 is a simplified diagram of the configuration of the interchangeable lens.

As shown in FIG. 1, a camera system 1 is an interchangeable lens type of single-reflex digital camera system, and mainly includes a camera main body 3 having the primary function of the camera system 1, and an interchangeable lens 2 that is removably attached to the camera main body 3. The interchangeable lens 2 is mounted on a lens mount 70 provided to the front face of the camera main body 3.

1.1: Camera Main Body

The camera main body 3 mainly includes an imaging unit 71 for forming an image of a subject, body microcomputer 12 serving as a main body controller for controlling the operation of the various components such as the imaging unit 71, an image display component 72 for displaying the captured image and various kinds of information, an image holder 73 for holding image data, a viewfinder optical system 19 through which the subject can be seen, and a nonvolatile memory 53.

The imaging unit 71 mainly includes an imaging sensor 11 such as a CCD for performing opto-electric conversion, a quick return mirror 4 for guiding incident light to the viewfinder optical system 19 and to a focus detection unit 5, a shutter unit 10 for adjusting the exposure state of the imaging sensor 11, a shutter controller 14 for controlling the drive of the shutter unit 10 on the basis of a control signal from the body microcomputer 12, an imaging sensor controller 13 for controlling the operation of the imaging sensor 11, a main body image blur correction device 75 for correcting image blur produced by shake of the camera system 1, and the focus detection unit 5 for detecting focus (the focused state of the subject image). The focus detection unit 5 performs its focus detection, for example, by a standard phase difference detection method.

The body microcomputer 12 is a control device serving as the functional center of the camera main body 3, and controls various sequences. More specifically, the body microcomputer 12 is equipped with a CPU, ROM, and RAM, and the body microcomputer 12 can perform many different functions when programs held in the ROM are read into the CPU. For instance, the body microcomputer 12 has the function of detecting that the interchangeable lens 2 has been mounted on the camera main body 3, the function of selecting which image blur correction device will perform image blur correction, the function of setting the image blur correction device to a correction-possible state or correction-impossible state, and so on. As shown in FIG. 1, the body microcomputer 12 is connected to the various components provided to the camera main body 3.

The image display component 72 includes a liquid crystal monitor 16 for image display, and an image display controller 15 for controlling the operation of the liquid crystal monitor 16. The image holder 73 includes an image recording and reproduction component 18 for recording and reproducing captured images to and from a card-type recording medium (not shown), for example, and an image recording controller 17 for controlling the operation of the image recording and reproduction component 18.

The quick return mirror 4 includes a main mirror 4a capable of reflecting and transmitting incident light, and a sub-mirror 4b that is provided on the rear face side of the main mirror 4a and reflects transmitted light from the main mirror 4a, and can be flipped up outside the optical path including the optical axis X by a quick return mirror controller 32. This incident light is split into two beams by the main mirror 4a, and the reflected beam is guided to the viewfinder optical system 19. The transmitted beam, meanwhile, is reflected by the sub-mirror 4b and utilized as an AF light beam for the focus detection unit 5. During normal photography, the quick return mirror 4 is flipped up outside the optical path including the optical axis X by the quick return mirror controller 32, and the shutter unit 10 is opened, so that an image of the subject is formed on the imaging surface of the imaging sensor 11. When photography is not in progress, as shown in FIG. 1, the quick return mirror 4 is disposed in the optical path including the optical axis X, and the shutter unit 10 is closed.

The viewfinder optical system 19 includes a viewfinder screen 6 where an image of the subject is formed, a pentaprism 7 for converting the subject image into an erect image, an eyepiece 8 for guiding the erect image of the subject to a viewfinder window 9, and the viewfinder window 9 through which the user can see the subject.

As shown in FIG. 2, the camera main body 3 is provided with a power switch 52 for switching the power on and off to the camera system 1, and a release button 50 operated by the user during focusing and release. When the power switch 52 is used to turn on the power, power is supplied to the various components of the interchangeable lens 2 and the camera main body 3. When the release button 50 is pressed halfway down, power is supplied to the various components including the body microcomputer 12 and a lens microcomputer 20.

Moreover, the nonvolatile memory 53 holds various kinds of information related to the camera main body 3 (main body information). This main body information includes, for example, information related to the model, for identifying the camera main body 3, such as the name of the manufacturer of the camera main body 3, the date of manufacture, the model number, the version of software installed in the body microcomputer 12, and information related to firmware updates (main body specifying information); information related to whether or not an image blur correction device has been mounted in the camera main body 3; when an image blur correction device has been mounted, information related to the detection performance, such as the sensitivity and the model number of a shake detector 30 (discussed below) (main body-side detection performance information, such as the information given in FIGS. 13A and 13B discussed below); information related to correction performance, such as the maximum possible correction angle and the model number of an image blur corrector 76 (main body-side correction performance information); and the version of the software used to perform image blur correction. Further, the main body information also includes information related to the power consumption necessary to drive the image blur corrector 76 (main body-side power consumption information) and information related to the drive style of the image blur corrector 76 (main body-side drive style information). This information may be held in a memory component 38 in the body microcomputer 12 instead of in the nonvolatile memory 53.

1.2: Interchangeable Lens

The interchangeable lens 2 constitutes an imaging optical system L for forming an image of a subject on the imaging sensor 11 in the camera system 1, and mainly includes a focus adjuster 80 for performing focusing, an aperture adjuster 81 for adjusting the aperture, a lens image blur correction device 82 for correcting image blur by adjust the optical path, the lens microcomputer 20 serving as a lens controller for controlling the operation of the interchangeable lens 2, and a nonvolatile memory 54.

The focus adjuster 80 mainly includes a focus lens group 24 for adjusting the focus, and a focus lens group controller 25 for controlling the operation of the focus lens group 24. The aperture adjuster 81 mainly includes a diaphragm 26 for adjusting the aperture or opening, and an aperture controller 27 for controlling the operation of the diaphragm 26.

The lens microcomputer 20 is a control device serving as the functional center of the interchangeable lens 2, and is connected to the various components mounted in the interchangeable lens 2. More specifically, the lens microcomputer 20 is equipped with a CPU, ROM, and RAM, and can perform many different functions when programs held in the ROM are read into the CPU. For instance, the lens microcomputer 20 has the function of setting the lens image blur correction device 82 to a correction-possible state or a correction-impossible state on the basis of a signal from the body microcomputer 12. Also, the body microcomputer 12 and the lens microcomputer 20 are electrically connected via electrical contacts (not shown) provided to the lens mount 70, which allows them to exchange information.

The nonvolatile memory 54 holds various kinds of information related to the interchangeable lens 2 (lens information). This lens information includes, for example, information related to the model, for identifying the interchangeable lens 2, such as the name of the manufacturer of the interchangeable lens 2, the date of manufacture, the model number, the version of software installed in the lens microcomputer 20, and information related to firmware updates (lens specifying information); information related to whether or not an image blur correction device has been mounted in the interchangeable lens 2; when an image blur correction device has been mounted, information related to the detection performance, such as the sensitivity and the model number of a shake detector 21 (discussed below) (lens-side detection performance information, such as the information given in FIG. 14A discussed below); information related to correction performance, such as the maximum possible correction angle and the model number of an image blur corrector 83 (lens-side correction performance information); and the version of the software used to perform image blur correction. Further, the lens information also includes information related to the power consumption necessary to drive the image blur corrector 83 (lens-side power consumption information) and information related to the drive style of the image blur corrector 83 (lens-side drive style information). A memory component 38 can hold information sent from the body micro computer 12. This information may be held in a memory component 38 in the lens microcomputer 20 instead of in the nonvolatile memory 54.

1.3: Image Blur Correction Device

Figure 4:
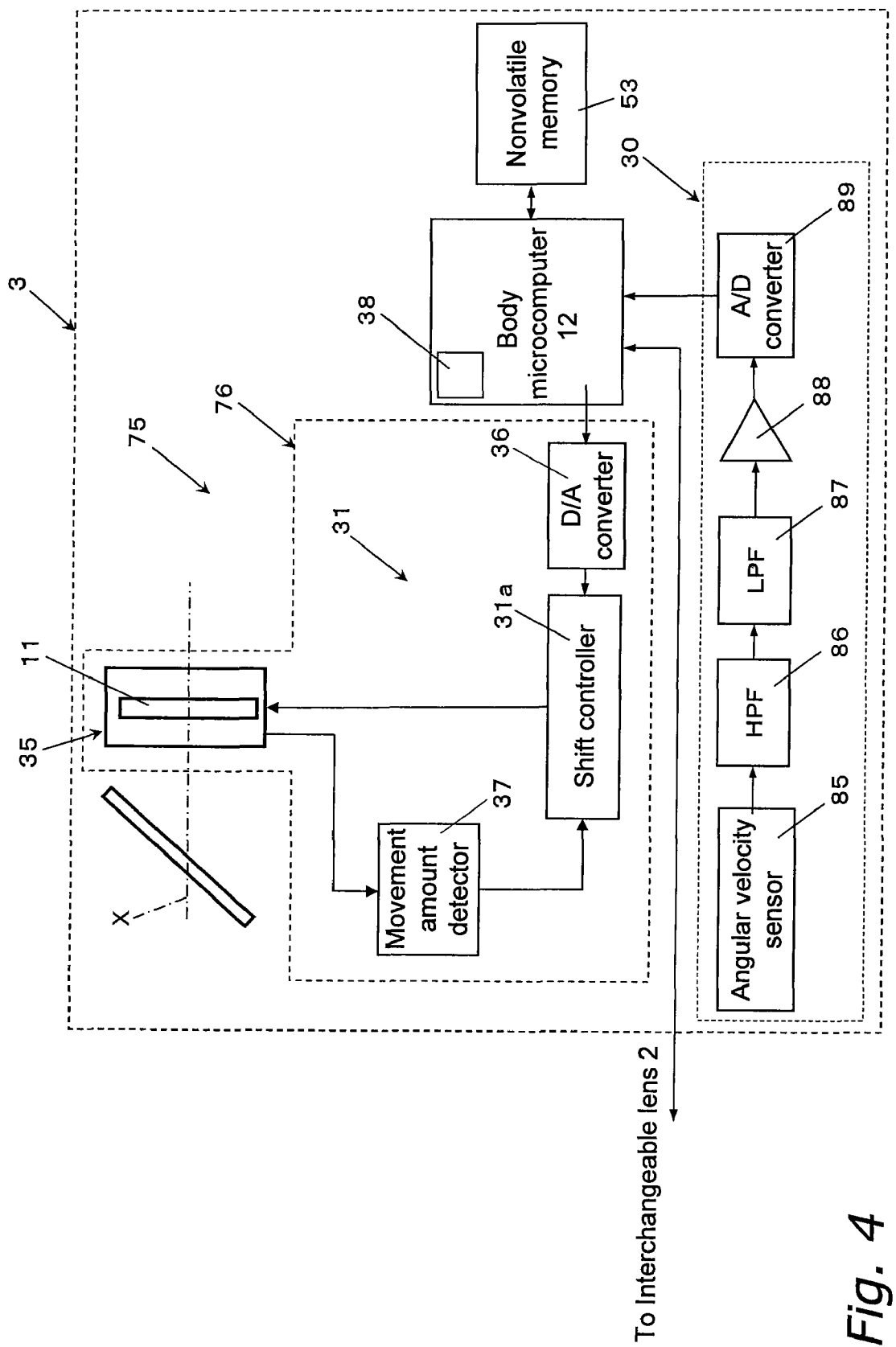
FIG. 4 is a block diagram of the hardware of an image blur correction device inside a camera main body according to the first embodiment of the present invention.
Figure 5:
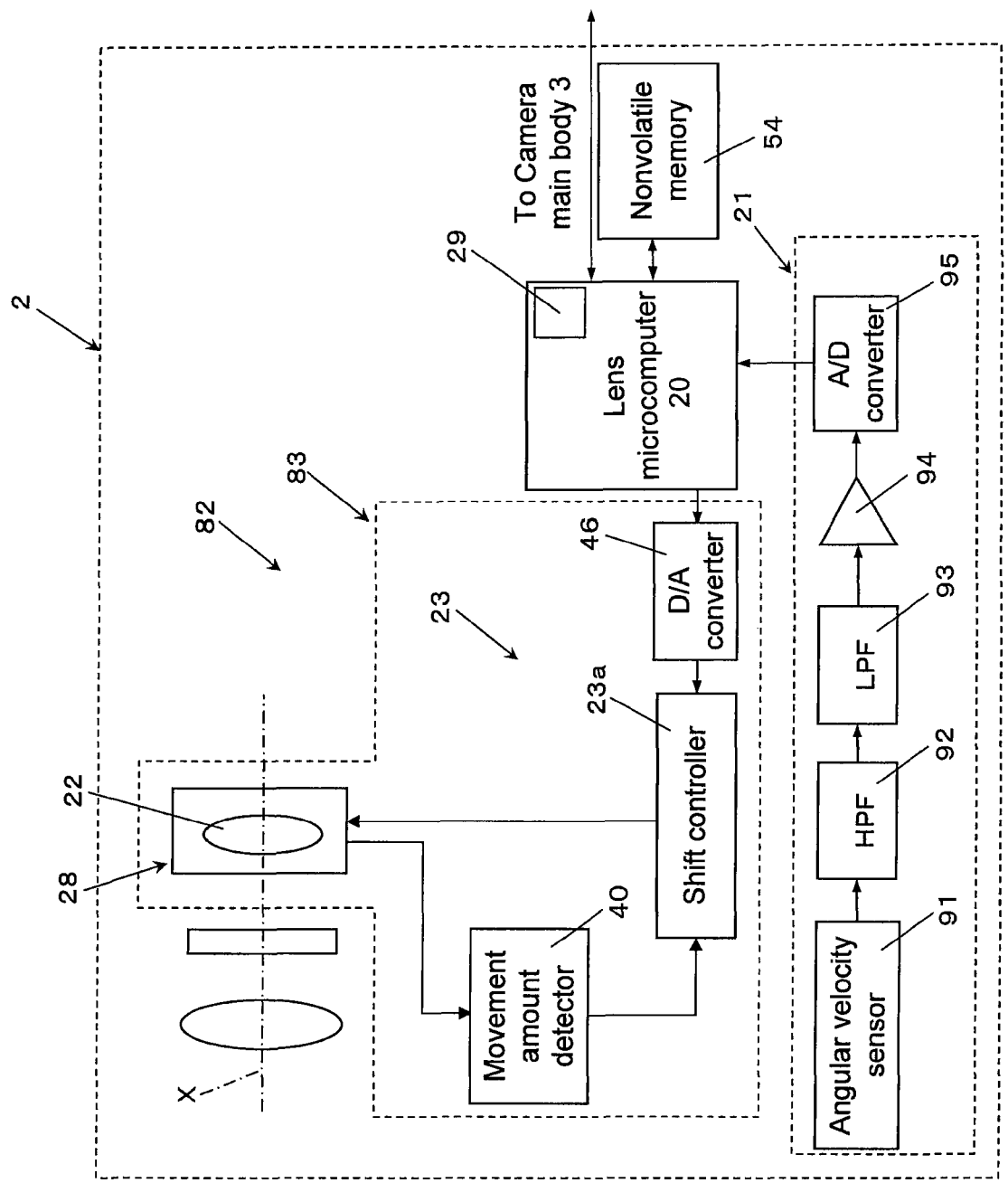
FIG. 5 is a block diagram of the hardware of an image blur correction device inside an interchangeable lens according to the first embodiment of the present invention.

The main body image blur correction device 75 and the lens image blur correction device 82 will now be described through reference to FIGS. 4 and 5. FIG. 4 is a block diagram of the hardware of the main body image blur correction device 75, and FIG. 5 is a block diagram of the hardware of the lens image blur correction device 82.

Main Body Image Blur Correction Device

As shown in FIG. 4, the image blur correction device 75 is a sensor shift type image blur correction device, and includes the main body shake detector 30 for detecting shake of the camera system 1, and the main body image blur corrector 76 for correcting image blur according to the amount of shake of the camera system 1 detected by the shake detector 30.

The shake detector 30 mainly includes an angular velocity sensor 85 for detecting the movement of the camera system 1 itself including the imaging optical system L, a HPF 8 as a high-pass filter for eliminating the direct current drift component from the unnecessary band component included in the output of the angular velocity sensor 85, a LPF 87 as a low-pass filter for eliminating the noise component or resonance frequency component of the sensor from the unnecessary band component included in the output of the angular velocity sensor 85, an amplifier 88 for adjusting the level of the output signal from the angular velocity sensor 85, and an A/D converter 89 for converting the output signal of the amplifier 88 into a digital signal.

The angular velocity sensor 85 outputs a positive or negative angular velocity signal, depending on the direction of movement of the camera system 1, on the basis of output in a state in which the camera system 1 is stopped. The angular velocity sensor 85 is a sensor for detecting movement in the yaw direction perpendicular to the optical axis, for example. An example of the angular velocity sensor 85 is a gyro sensor. In FIG. 4, the angular velocity sensor 85 for just one direction is shown, and the shake detector for the pitch direction is omitted.

The image blur corrector 76 mainly includes the imaging sensor 11 as part of the imaging unit 71, an imaging sensor driver 35 for moving the imaging sensor 11 up, down, left, and right within a plane perpendicular to the optical axis X of the imaging optical system L, and an image blur correction controller 31 for controlling the drive of the imaging sensor driver 35.

The image blur correction controller 31 further includes a movement amount detector 37 for detecting the actual amount of movement of the imaging sensor 11 in the imaging sensor driver 35, a shift controller 31a for controlling the operation of the imaging sensor driver 35 so that the amount of movement detected by the movement amount detector 37 will be the drive control amount outputted from the body microcomputer 12 (hereinafter referred to as a control signal), and a D/A converter 36 for converting the control signal outputted from the body microcomputer 12 into an analog signal. A feedback control loop for drive control of the imaging sensor driver 35 is formed in the interior of the image blur correction device 75 by the shift controller 31a and the movement amount detector 37.

Also, the body microcomputer 12 has a control signal generator for subjecting the output signal of the angular velocity sensor 85 taken in via the A/D converter 89 to filtering, integration processing, phase compensation, gain adjustment, clipping, or the like, and finding and outputting the control signal of the imaging sensor 11 necessary for shake correction. The control signal that is found here is outputted through the D/A converter 36 of the image blur correction controller 31 to the shift controller 31a. The shift controller 31a controls the drive of the imaging sensor 11 on the basis of this control signal.

Thus, the imaging sensor 11 is shifted by the imaging sensor driver 35 so that the amount of shake detected by the shake detector 30 will be canceled out. As a result, image blur produced by shake of the camera system 1 can be corrected on the camera main body 3 side, the effect of hand shake or the like by the user can be suppressed, and a better image can be captured.

Various kinds of program for controlling the drive of the camera main body 3, or data indicating the amount of shift from the optical axis center of the imaging sensor 11 according to the focal distance of the interchangeable lens 2 used during image blur correction, etc., is stored in the memory component 38 of the body microcomputer 12. This information may be stored in the nonvolatile memory 53 instead of in the memory component 38. In general, the correction range of an image blur correction device using an image sensor is in a specific relationship with the focal distance of the attached interchangeable lens. That is, if we let f (m) be the focal distance of the interchangeable lens, and θ (rad) be the angle at which the camera system is shaken by vibration within a specific time (within the exposure time), then the amount ΔY (m) of movement of the image over the image sensor is expressed by the following Formula 1.

$$\Delta Y = f \times \tan \theta \quad (1)$$

Therefore, image blur can be corrected by driving the imaging sensor 11 in reverse during image blur correction, and canceling out the amount of movement ΔY of this image. In other words, the maximum possible correction angle θ at which image blur can be corrected is determined by the movable range of the individual image blur correction devices 75 and 82.

Lens Image Blur Correction Device

As shown in FIG. 5, the image blur correction device 82 is an optical type of image blur correction device, and mainly includes the lens shake detector 21 for detecting shake of the camera system 1, and the lens image blur corrector 83 for correcting image blur according to the amount of shake detected by the shake detector 21.

The shake detector 21 mainly includes an angular velocity sensor 91 for detecting the movement of the camera system 1 itself, including the imaging optical system L, an HPF 92 as a high-pass filter for eliminating the direct current drift component from the unnecessary band component included in the output of the angular velocity sensor 91, a LPF 93 as a low-pass filter for eliminating the noise component or resonance frequency component of the sensor from the unnecessary band component included in the output of the angular velocity sensor 91, an amplifier 94 for adjusting the level of the output signal of the angular velocity sensor 91, and an A/D converter 95 for converting the output signal of the amplifier 94 into a digital signal. An example of the angular velocity sensor 91 is a gyro sensor.

The image blur corrector 83 mainly includes the shake correction lens group 22 that constitutes part of the imaging optical system L, a correction lens driver 28 for moving the shake correction lens group 22 within a plane perpendicular to the optical axis X of the imaging optical system L, and an image blur correction controller 23 for controlling the operation of the correction lens driver 28 according to the amount of shake detected by the shake detector 21.

The image blur correction controller 23 further includes a movement amount detector 40 for detecting the actual amount of movement of the shake correction lens group 22 in the correction lens driver 28, a shift controller 23a for controlling the operation of the correction lens driver 28 so that the amount of movement detected by the movement amount detector 40 will be the drive control amount outputted from the lens microcomputer 20 (hereinafter referred to as a control signal), and a D/A converter 46 for converting the control signal outputted from the lens microcomputer 20 into an analog signal. A feedback control loop for drive control of the correction lens driver 28 is formed in the interior of the image blur correction device 82 by the shift controller 23a and the movement amount detector 40.

Thus, image blur can be corrected by shifting the imaging sensor 11 with the imaging sensor driver 35 so that the amount of shake detected by the shake detector 30 will be canceled out.

The lens microcomputer 20 has a control signal generator for subjecting the output signal of the angular velocity sensor 91 taken in via the A/D converter 45 to filtering, integration processing, phase compensation, gain adjustment, clipping, or the like, and finding and outputting the control signal of the imaging sensor driver 35 necessary for shake correction. The control signal that is found here is outputted through the D/A converter 36 to the image blur correction controller 23. The image blur correction controller 23 controls the drive of the shake correction lens group 22 on the basis of this control signal. As a result, image blur produced by shake of the camera system 1 can be optically corrected on the interchangeable lens 2 side, the effect of hand shake or the like by the user can be suppressed, and a better image can be captured.

Various kinds of program for controlling the drive of the interchangeable lens 2, or data indicating the relationship between the amount of movement of the focus lens group 24 and the distance to the subject or the focal distance, or data indicating the amount of shift from the optical axis center of the shake correction lens group 22 according to the focal distance, etc., is stored in the memory component 29 of the lens microcomputer 20. As to the amount of shift of this shake correction lens group 22, information according to the maximum possible correction angle θ at which image blur can be corrected by the interchangeable lens 2, on the basis of the amount of image movement ΔY expressed by the previously mentioned Formula 1, is stored in the memory component 29. Further, information according to the power consumption or the like necessary to drive the shake correction lens group 22 during image blur correction is stored in this memory component 29. This information may be held in the nonvolatile memory 54 instead of in the memory component 29.

2: Operation of the Camera System

Figure 6:
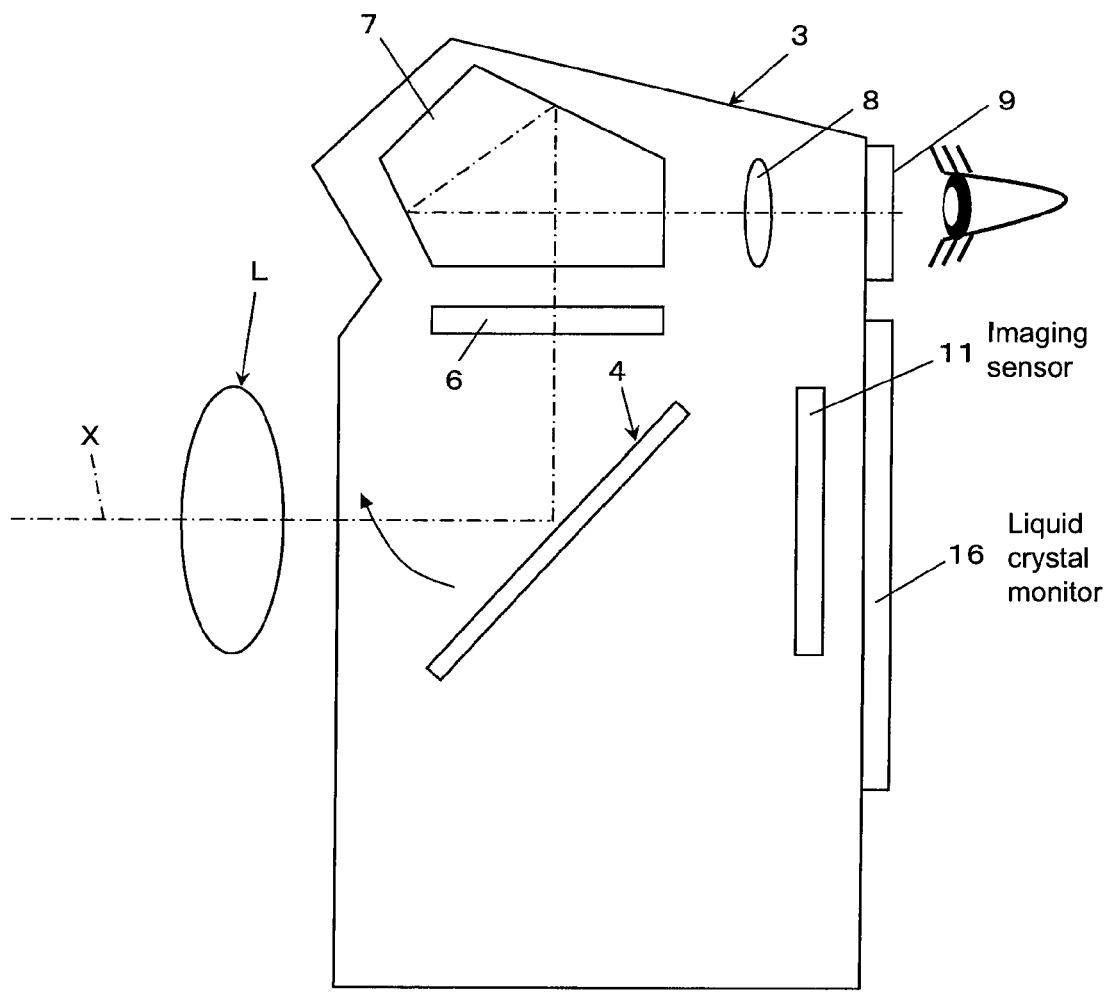
FIG. 6 is a concept diagram illustrating the concept of photography according to the first embodiment of the present invention.

The imaging operation of the camera system 1 will be described through reference to FIGS. 1 to 6. FIG. 6 is a concept diagram during photography with the camera system 1.

2.1: Operation Prior to Imaging

As shown in FIGS. 1 and 6, light from a subject (not shown) passes through the interchangeable lens 2 and is incident on the main mirror 4a, which is a semitransparent mirror. Part of the light incident on the main mirror 4a is reflected and is incident on the viewfinder screen 6, and the rest of the light is transmitted and is incident on the sub-mirror 4b. The light incident on the viewfinder screen 6 forms a subject image. This subject image is converted by the pentaprism 7 into an erect image, which is incident on the eyepiece 8. This allows the user to observe an erect image of the subject through the viewfinder window 9. Also, the light incident on the sub-mirror 4b is reflected and is incident on the focus detection unit 5.

2.2: Operation During Imaging

As shown in FIGS. 1 and 6, when the user looks through the viewfinder window 9 to take a photograph, and when the user presses the release button 50 halfway down, power is supplied to the body microcomputer 12 and the various units in the camera system 1, and the body microcomputer 12 and the lens microcomputer 20 are activated. The body microcomputer 12 and the lens microcomputer 20 are programmed so as to exchange information back and forth upon activation via the electrical contacts (not shown) of the lens mount 70. For instance, lens information related to the interchangeable lens 2 is sent from the memory component 29 of the lens microcomputer 20 to the body microcomputer 12, and this lens information is held in the memory component 38 of the body microcomputer 12. At this point the body microcomputer 12 also receives information related to whether or not the lens image blur correction device 82 has been installed in the interchangeable lens 2.

Next, the amount of defocus (hereinafter referred to as the Df amount) is acquired by the focus detection unit 5 on the basis of the reflected light from the sub-mirror 4b. A command is sent from the body microcomputer 12 to the lens microcomputer 20 so that the focus lens group 24 will be driven by this Df amount. More specifically, the focus lens group controller 25 is controlled by the lens microcomputer 20 and the focus lens group 24 is moved by the Df amount. Thus, the Df amount can be reduced by repeating this focus detection and drive of the focus lens group 24. Once the Df amount is at or below a specific level, it is determined by the body microcomputer 12 that the system is focused, and the drive of the focus lens group 24 is stopped.

After this, when the release button 50 is pressed all the way down by the user, a command is sent from the body microcomputer 12 to the lens microcomputer 20 so as to obtain an aperture value calculated on the basis of the output from a light sensor (not shown). The aperture controller 27 is controlled by the lens microcomputer 20, and the aperture is closed until the designed aperture is attained. Simultaneously with the designation of the aperture value, the quick return mirror 4 is retracted from the optical path including the optical axis X by the quick return mirror controller 32. Upon completion of this retraction, a command to drive the imaging sensor 11 is outputted from the imaging sensor controller 13, and the operation of the shutter unit 10 is indicated. The imaging sensor 11 is exposed for the length of time of the shutter speed calculated on the basis of the output from a light sensor (not shown) by the imaging sensor controller 13.

Upon completion of this exposure, the imaging sensor controller 13 reads image data from the imaging sensor 11, and after specific image processing, image data is outputted through the body microcomputer 12 to the image display controller 15. As a result, the captured image is displayed on the liquid crystal monitor 16. Also, image data is held in a storage medium via the image recording controller 17 and the image recording and reproduction component 18. Upon completion of the exposure, the quick return mirror 4 and the shutter unit 10 are reset to their initial positions by the body microcomputer 12. The aperture controller 27 issues a command from the body microcomputer 12 to the lens microcomputer 20 to reset the aperture to its open position, and commands are sent from the lens microcomputer 20 to the various units. Upon completion of this resetting, the lens microcomputer 20 notifies the body microcomputer 12 of the completion of resetting. The body microcomputer 12 waits for the reset completion information and the completion of a series of processing after exposure from the lens microcomputer 20, and then confirms that the release button does not remain in pressed state, which concludes the imaging sequence.

Figure 7:
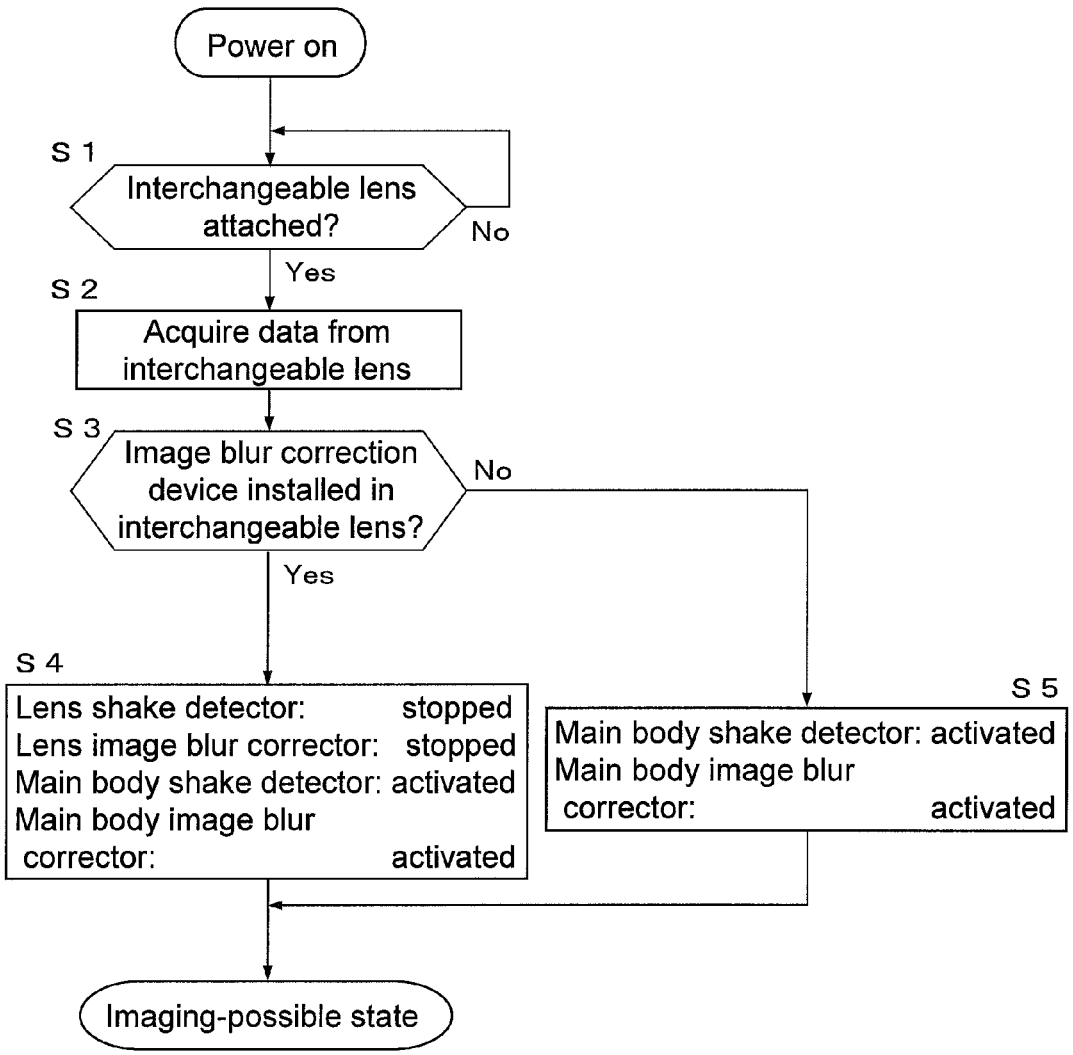
FIG. 7 is a flowchart illustrating the sequence related to the selecting operation of the image blur correction device according to the first embodiment of the present invention.

2.3: Selection Operation when the Interchangeable Lens has been Mounted on the Camera Main Body Next, the specific operation of selecting the shake detector and image blur corrector when the interchangeable lens 2 is mounted on the camera main body 3 will be described through reference to FIG. 7. FIG. 7 is a flowchart of when the interchangeable lens 2 is attached to the camera main body 3. The description here will be of a case in which the image blur corrector 76 and the shake detector 30 of the camera main body 3 predetermined by the body microcomputer 12 are preferentially selected.

As shown in FIG. 7, when the interchangeable lens 2 is mounted on the camera main body 3, the body microcomputer 12 of the camera main body 3 detects that the interchangeable lens 2 has been mounted (detection step: S1). After the interchangeable lens 2 is mounted, information about whether or not the lens image blur correction device 82 has been installed in the interchangeable lens 2 is acquired by the body microcomputer 12 from the memory component 29 in the interchangeable lens 2 (S2). This information includes information related to whether or not an image blur correction device has been installed, and on the basis of this, the body microcomputer 12 determines whether or not the lens image blur correction device 82 has been installed in the interchangeable lens 2 (selection step: S3). If the lens image blur correction device 82 has been installed in the interchangeable lens 2, the main body shake detector 30 and image blur corrector 76 are given preference, so the lens shake detector 21 and image blur corrector 83 are stopped (correction-impossible setting step: S4), and the drive of the main body shake detector 30 and main body image blur corrector 76 is started (correction-possible setting step: S5). The phrase "activation of the image blur corrector" here means that the image blur corrector is set to a correction-possible state, and "stopping of the image blur corrector" means that the image blur corrector is set to a correction-impossible state.

On the other hand, if the lens image blur correction device 82 has not been installed in the interchangeable lens 2, the drive of the main body shake detector 30 and image blur corrector 76 is automatically started (S5). To stop the image blur corrector 83 in the interchangeable lens 2 here, a mechanically locking mechanism may be used, or current may be sent to an actuator to effect self-holding, so that the optical axis X is coaxial with the optical axis center of the shake correction lens group 22. The method employed here is to preferentially drive the main body shake detector 30 and image blur corrector 76, but it is also possible to preferentially drive the lens shake detector 21 and image blur corrector 83 in the interchangeable lens 2. Furthermore, if an image blur correction device is installed in just the interchangeable lens 2 or the camera main body 3, but not both, then the image blur correction device that has been installed may be operated.

As discussed above, with this camera system 1, it is automatically determined whether an image blur correction device has been installed in the interchangeable lens 2 or the camera main body 3, or both, and just the shake detector that has been preset, and just one image blur corrector, are automatically driven. As a result, even when image blur correction devices have been installed in the camera main body 3 and the interchangeable lens 2, the image blur correction devices can be operated properly, without malfunction.

Second Embodiment

Figure 8:
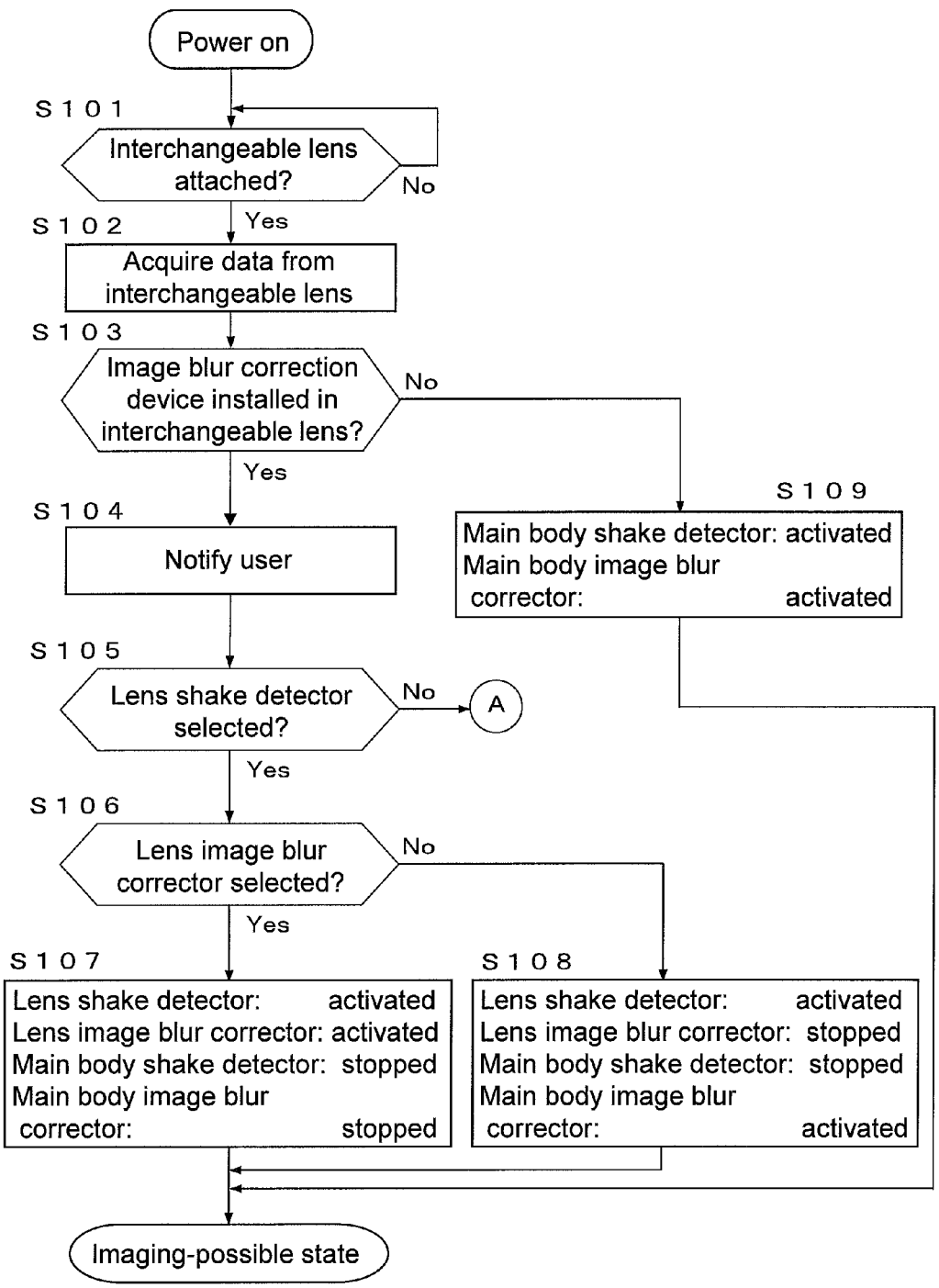
FIG. 8 is a flowchart illustrating the sequence related to the selecting operation of the image blur correction device according to a second embodiment of the present invention.
Figure 9:
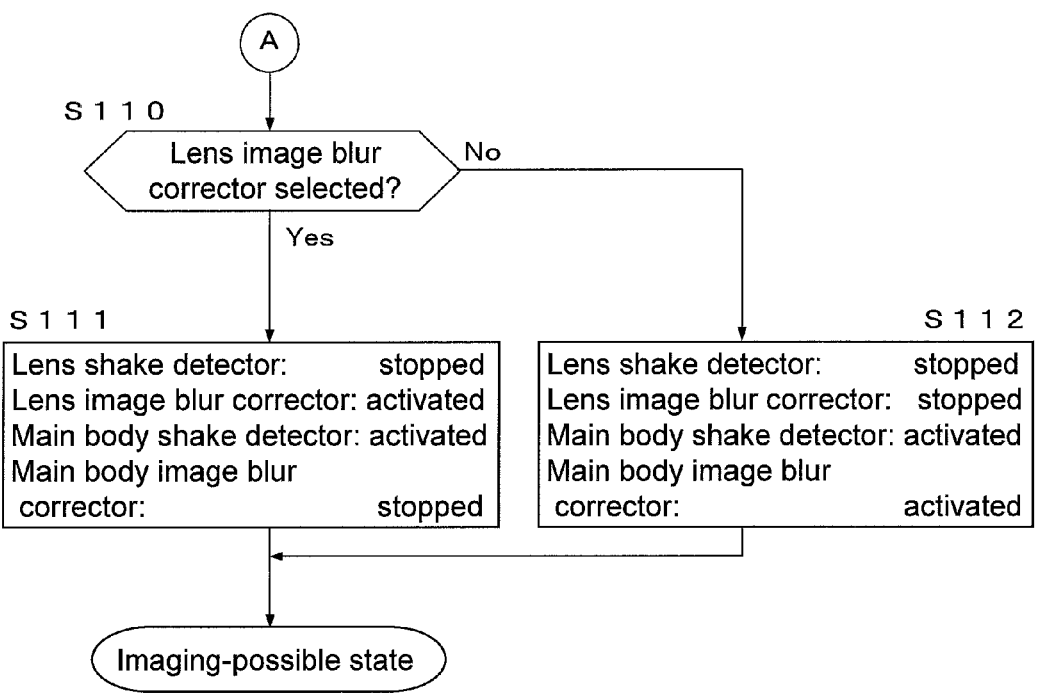
FIG. 9 is a flowchart illustrating the sequence related to the selecting operation of the image blur correction device according to the second embodiment of the present invention.

In the above embodiment, the image blur correction device was automatically selected by the body microcomputer 12 when the interchangeable lens 2 was mounted. A case in which the selection is made manually by the user is also possible, however. A camera system according to a second embodiment of the present invention will be described through reference to FIGS. 8 and 9. FIGS. 8 and 9 are flowcharts of the selecting operation of the image blur correction device according to a third embodiment of the present invention. Those components that are the same as in the above embodiment will be numbered the same, and will not be described again.

As shown in FIG. 2, the camera main body 3 includes a detector select switch 51 and a corrector select switch 55. The detector select switch 51 is a switch that allows either the main body shake detector 30 or the lens shake detector 21 to be selected from the outside, and the corrector select switch 55 is a switch that allows either the main body image blur corrector 76 or image blur corrector 83 to be selected from the outside.

The selection operation sequence in this case will be described. As shown in FIG. 8, when the interchangeable lens 2 is mounted on the camera main body 3, the body microcomputer 12 of the camera main body 3 detects that the interchangeable lens 2 has been mounted (detection step: S101). After the interchangeable lens 2 is mounted, information about whether or not the lens image blur correction device 82 has been installed in the interchangeable lens 2 is acquired by the body microcomputer 12 from the memory component 29 in the interchangeable lens 2 (S102). This information includes information related to whether or not an image blur correction device has been installed, and on the basis of this, the body microcomputer 12 determines whether or not the lens image blur correction device 82 has been installed in the interchangeable lens 2 (selection step: S103). If the lens image blur correction device 82 has not been installed in the interchangeable lens 2, the main body shake detector 30 and image blur corrector 76 are activated (S109).

On the other hand, if the lens image blur correction device 82 has been installed in the interchangeable lens 2, information about whether or not the shake detector 21 and image blur corrector 83 in the interchangeable lens 2 are being used, or whether or not the shake detector 30 or image blur corrector 76 in the camera main body 3 are being used is displayed on the liquid crystal monitor 16 (S104). Next, one of the shake detectors 30 and 21 is selected (selection step: S105). More specifically, the user selects one of the shake detectors by using the detector select switch 51. Also, one of the image blur correctors 76 and 83 is selected (selection step: S106, S110). More specifically, the user selects one of the image blur correctors by using the corrector select switch 55.

In the selection step, when the lens shake detector 21 and image blur corrector 83 are selected, for example, the lens shake detector 21 and image blur corrector 83 are activated by the body microcomputer 12 via the lens microcomputer 20, and the main body shake detector 30 and image blur corrector 76 are stopped by the body microcomputer 12 (switching step: S107). Also, when the lens shake detector 21 and the main body image blur corrector 76 are selected, the lens shake detector 21 and the main body image blur corrector 76 are activated, and the lens image blur corrector 83 and the main body shake detector 30 are stopped (switching step: S108).

As shown in flow A, when the main body shake detector 30 and the lens image blur corrector 83 are selected, the main body shake detector 30 and the lens image blur corrector 83 are activated, and the lens shake detector 21 and the main body image blur corrector 76 are stopped (switching step: S111). Also, when the main body shake detector 30 and image blur corrector 76 are selected, the main body shake detector 30 and image blur corrector 76 are activated, and the lens shake detector 21 and image blur corrector 83 are stopped (switching step: S112).

As discussed above, in this case, the user can select whether to use the shake detector and image blur corrector of the interchangeable lens 2 or of the camera main body 3. As a result, even when an image blur correction device has been installed in the camera main body 3 and the interchangeable lens 2, the image blur corrector can be operated properly, without malfunction. Also, if the shake detectors 30 and 21 and the image blur correctors 76 and 83 have different performance or characteristics, the image blur correction that good suits the preference of the user can be carried out.

When information is displayed on the liquid crystal monitor 16, additional information related to model or performance, such as which shake detector has the newer model number, or which image blur corrector has the newer model number, may be displayed for the sake of reference when the user is making a selection, for example.

Also, either the detector select switch 51 or the corrector select switch 55 can be selected, but the following configuration may be employed.

For instance, when the detector select switch 51 (main body-side detection selector) is a switch that allows the shake detector 30 in the camera main body 3 to be switched on and off, the detector select switch 51 can be used to select which shake detector will be used. For example, when the main body shake detector 30 is switched on by the detector select switch 51, detection with the shake detector 30 is commenced by the body microcomputer 12, and the lens shake detector 21 is stopped. On the other hand, when the main body shake detector 30 is switched off by the detector select switch 51, the shake detector 30 is stopped by the body microcomputer 12, and detection with the lens shake detector 21 is commenced by the lens microcomputer 20.

It is also conceivable that the corrector select switch 55 (lens-side correction selector) will be provided on the interchangeable lens 2 side, and be a switch that allows the shake detector 21 in the interchangeable lens 2 to be switched on and off. For instance, when the lens shake detector 21 is switched on by the corrector select switch 55, detection with the lens shake detector 21 is commenced by the lens microcomputer 20, and the main body shake detector 30 is stopped by the body microcomputer 12. On the other hand, when the lens shake detector 21 is switched off by the corrector select switch 55, the lens shake detector 21 is stopped by the lens microcomputer 20, and detection with the main body shake detector 30 is commenced by the body microcomputer 12.

Again in these cases, the image blur correction devices can be operated properly, without malfunction.

Third Embodiment

With the first embodiment above, when an image blur correction device is installed in the camera main body 3 and the interchangeable lens 2, it is predetermined which shake detector will be given preference and which image blur corrector will be given preference. Also, with the second embodiment above, the user selects one shake detector and one image blur corrector.

Figure 10:
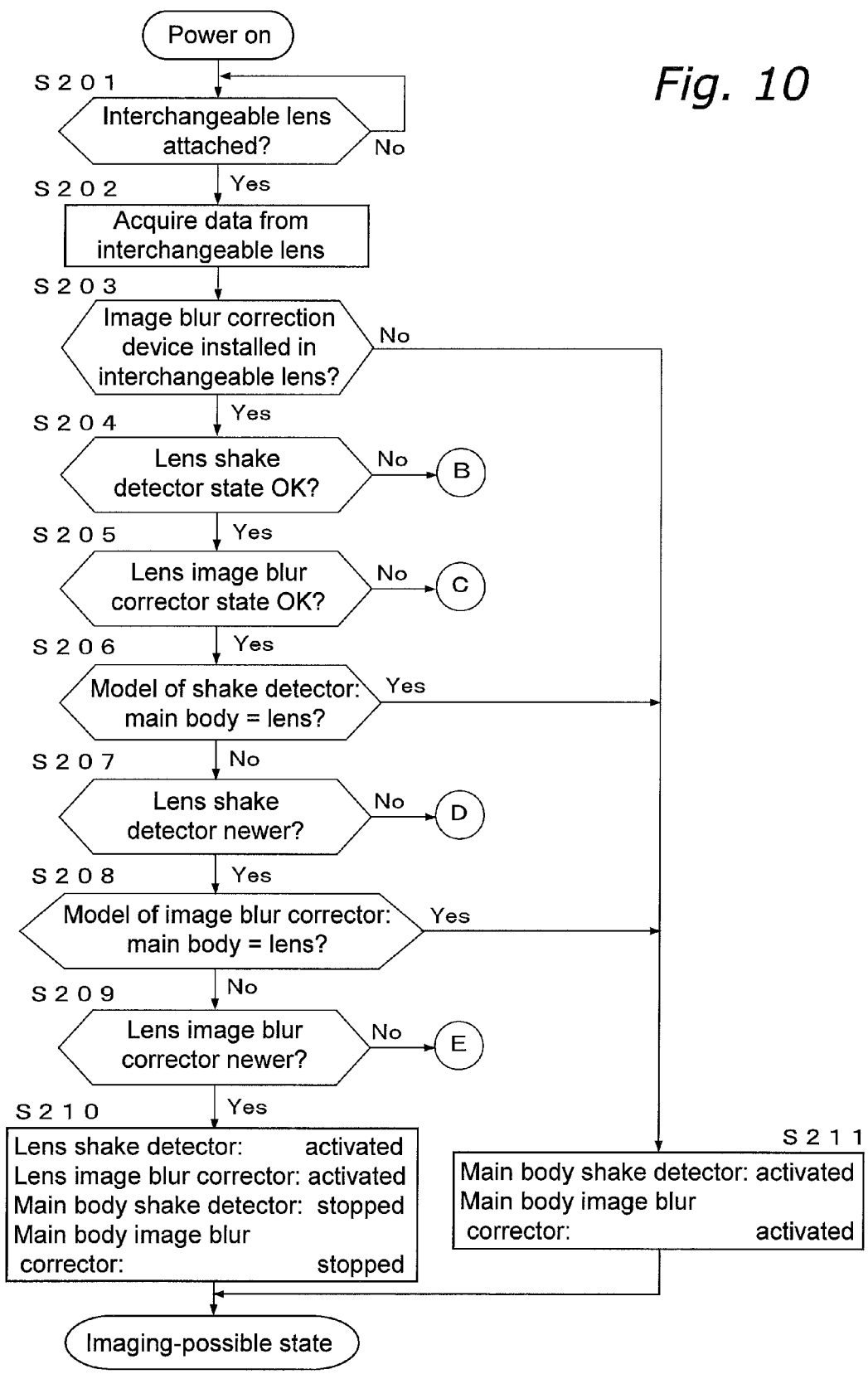
FIG. 10 is a flowchart illustrating the sequence related to the selecting operation of the image blur correction device according to a third embodiment of the present invention.
Figure 11:
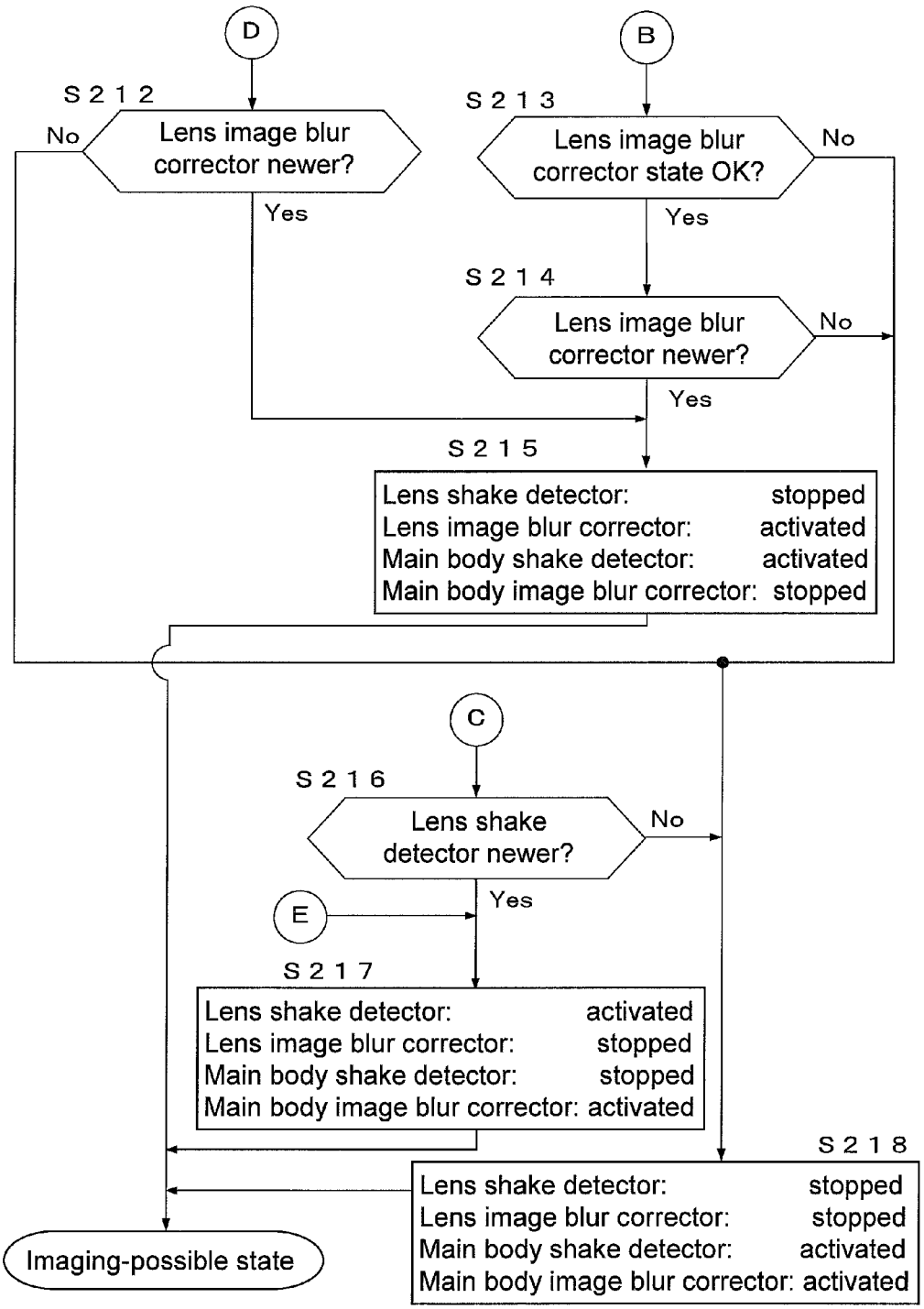
FIG. 11 is a flowchart illustrating the sequence related to the selecting operation of the image blur correction device according to the third embodiment of the present invention.

However, it is also possible to determine which shake detector and which image blur corrector will be selected on the basis of specific information held in the nonvolatile memories 53 and 54 or the memory components 29 and 36. The camera system according to a third embodiment of the present invention will be described through reference to FIGS. 10 and 11. FIGS. 10 and 11 are flowcharts of the selecting operation of the image blur correction device according to the third embodiment of the present invention. Those components that are the same as in the above embodiment will be numbered the same, and will not be described again.

As shown in FIGS. 10 and 11, the body microcomputer 12 determines whether or not the interchangeable lens 2 has been mounted on the camera main body 3 (detection step: S201). If it is determined that the interchangeable lens 2 has been mounted, information about whether or not the image blur correction device 82 has been installed in the interchangeable lens 2 is acquired by the body microcomputer 12 from the memory component 29 in the interchangeable lens 2 (S202). Next, it is determined on the basis of this information whether or not the image blur correction device 82 has been installed in the interchangeable lens 2 (S203). If the image blur correction device 82 has not been installed, the main body shake detector 30 and image blur corrector 76 are activated.

On the other hand, if the image blur correction device 82 has been installed in the interchangeable lens 2, the state of the shake detector 21 (S204) and the state of the image blur corrector 83 (S205, S211) are confirmed by the body microcomputer 12 on the basis of status information sent from the lens microcomputer 20.

Next, model information (such as manufacture date, model number, etc.) for the shake detectors 30 and 21 is compared by the body microcomputer 12 on the basis of the main body information and lens information held in the nonvolatile memories 53 and 54 and the memory components 29 and 36. For instance, if the models of the shake detectors 30 and 21 are the same, the predetermined main body shake detector 30 is activated (S206, S211). If the models of the shake detectors 30 and 21 are different, the body microcomputer 12 selects either of the shake detectors 30 or 21 (selection step: S207, S216). More specifically, the body microcomputer 12 selects whichever of the shake detectors 30 and 21 is the newer type.

Similarly, the models of the image blur correctors 76 and 83 are compared, and if they are the same, the predetermined main body image blur corrector 76 is activated (S208, S211). If the models are different, the body microcomputer 12 selects either of the image blur correctors 76 or 83 on the basis of main body information and lens information (selection step: S209, S212, S214). More specifically, the body microcomputer 12 selects whichever of the shake detectors 30 and 21 is the newer type When the lens shake detector 21 and image blur corrector 83 are selected, the lens shake detector 21 and image blur corrector 83 are activated through the lens microcomputer 20 by the body microcomputer 12, and the main body shake detector 30 and image blur corrector 76 are stopped by the body microcomputer 12 (switching step: S210). To stop the image blur corrector 76, here, a mechanically locking mechanism may be used, or current may be sent to an actuator to effect self-holding, so that the optical axis X is coaxial with the center of the imaging sensor 11.

Thus, the activation and stopping of the shake detectors and image blur correctors are carried out according to selection state or the state of the shake detectors and image blur correctors (switching step S210, S215, S217, S218).

As discussed above, even though a shake detector and an image blur corrector are provided to the interchangeable lens 2 side and to the camera main body 3 side, one of the shake detectors and one of the image blur correctors are automatically selected as above, so the image blur correction devices can be operated properly. Also, since the state of the shake detectors and image blur correctors is confirmed, or the one that is the newer model is selected, so the image blur correction performance of the camera system can be utilized to its full potential.

The selection criteria are not limited to the model, and may be power consumption, the maximum possible correction angle, sensitivity of shake detection, information related to firmware updates, the drive style of the image blur corrector, etc. Also, the configuration may be such that the selection criteria can be arbitrarily changed.

When the lens shake detector 21 and the main body image blur corrector 76 are activated, and when the main body shake detector 30 and the lens image blur corrector 83 are activated, signal conversion is performed so that the output signal from the shake detector can be utilized by the image blur corrector by using sensitivity information, as described below.

Figure 12:
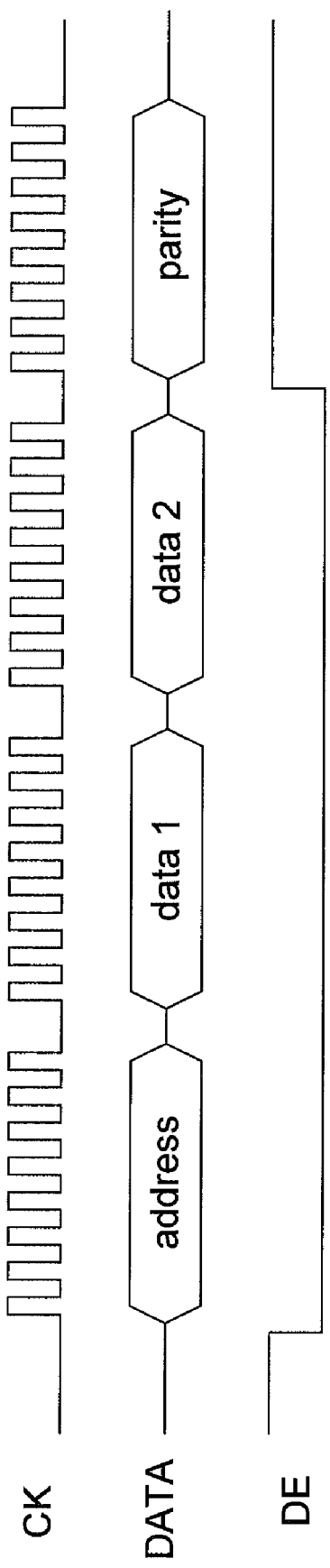
FIG. 12 is an example of a communication waveform diagram of a body microcomputer and a lens microcomputer.

The communication state of the camera main body 3 and the interchangeable lens 2 will now be described through reference to FIGS. 12 to 15. FIG. 12 is a communication waveform diagram of the body microcomputer 12 and the lens microcomputer 20, FIGS. 13A and 13B show sensitivity information and transfer information held in the nonvolatile memory 53 on the camera main body 3 side, FIGS. 14A and 14B show sensitivity information and transfer information held in the nonvolatile memory 54 on the interchangeable lens 2 side, and FIGS. 15A and 15B include waveform diagrams for the camera main body 3 and the interchangeable lens 2. FIG. 13A lists information related to the sensitivity of the shake detector 30 held in the nonvolatile memory 53 of the camera main body 3, and FIG. 13B lists information sent from the body microcomputer 12 to the lens microcomputer 20. FIG. 14A lists information related to sensitivity held in the nonvolatile memory 54 of the interchangeable lens 2, and FIG. 14B lists information sent from the lens microcomputer 20 to the body microcomputer 12. FIG. 15A is a data waveform diagram for angular velocity (deg/s) based on hand shake on the camera main body 3 side or on the interchangeable lens 2 side, and FIG. 15B is a data waveform diagram for angle (deg) based on hand shake on the camera main body 3 side or on the interchangeable lens 2 side.

In FIG. 12, "CK" is a clock signal sent from the body microcomputer 12 to the lens microcomputer 20, "DATA" is a data signal sent back and forth between the body microcomputer 12 and the lens microcomputer 20, and "DE" is a data enable signal indicating the state of exchange and sent from the body microcomputer 12 to the lens microcomputer 20. The data signal includes, for example, an address, data 1, data 2, or a parity bit. The lens micro computer 20 reads out data signal with timing based on the clock signal. An address is information for identifying such as the write information and transfer information in FIGS. 13A to 14B. Data 1 and data 2 are made up of 16 bits, consisting of low 8 bits and high 8 bits as in FIGS. 13A to 14B. The parity bit is information for confirming whether or not the correct information has been sent between the body microcomputer 12 and the lens microcomputer 20. More specifically, in the lens microcomputer 20 or the body microcomputer 12, for example, the address is added to data 1 and data 2 to calculate the low 8 bits, and this data is sent as a parity from the lens microcomputer 20 to the body microcomputer 12. The data 1 and data 2 that are sent and received express information designated by the address shown in FIGS. 8 and 12 for example, the body microcomputer 12 and the lens microcomputer 20 classify this information by address, and it is determined whether the information should be sent from the body microcomputer 12 to the lens microcomputer 20, or from the lens microcomputer 20 to the body microcomputer 12.

For example, when image blur correction is performed by the main body shake detector 30 and the lens image blur corrector 83, the output signal from the shake detector 30 is sent at a specific period through the body microcomputer 12 to the lens microcomputer 20. If the sensitivity here is the same for the lens shake detector 21 and the main body shake detector 30, the output signal from the shake detector 30 can be used just as it is to perform image blur correction with the image blur corrector 83.

However, if the sensitivity of the lens shake detector 21 is different from that of the main body shake detector 30, the output signal from the shake detector 30 cannot be used as it is. For example, as shown in FIGS. 13A and 13B, let us consider a case in which the angle detection sensitivity of the main body shake detector 30 is $B\theta x = B\theta y = 16384$ (LSB/deg), the angular velocity detection sensitivity is $B\omega x = B\omega y = 256$ (LSB/(deg/s)), the angle detection sensitivity of the lens shake detector 21 is $L\theta x = L\theta y = 32768$ (LSB/deg), and the angular velocity detection sensitivity is $L\omega x = L\omega y = 512$ (LSB/(deg/s)). In this case, as shown in FIG. 15B, the detected angle $B\theta x = \theta 1 = +0.017$ (deg) obtained from the shake detector 30 is multiplied by the sensitivity $B\theta x = 16384$ (LSB/deg) for angle information of the shake detector 30, the product of which is $\theta Bx = 278$ (LSB). The hexadecimal notation of this $\theta Bx$ is "0x0116." When this is sent to the lens microcomputer 20, it is converted by the lens microcomputer 20 into the detected angle $\theta Bx$. At this point, the lens microcomputer 20 divides the detected angle $\theta Bx = 278$ (LSB) by the sensitivity $L\theta x = 32768$ (LSB/deg) for angle information of the lens shake detector 21, the quotient of which is $\theta Bx = 0.008484$ (deg), so the detected angles are different.

With this camera system 1, this problem is solved on the basis of the sensitivity information shown in FIGS. 13A and 14A and previously stored in the nonvolatile memories 53 and 54. More specifically, when the body microcomputer 12 acquires information on the interchangeable lens 2 side, sensitivity information about the shake detector 21 held in the nonvolatile memory 54 is also acquired, and is stored in the nonvolatile memory 53. When the shake detector 30 is used to perform image blur correction with the image blur corrector 83, the output signal from the shake detector 30 is converted to hexadecimal number using the sensitivity information about the shake detector 21. For instance, to use the example given above, the detected angle $\theta Bx = \theta 1 = +0.017$ (deg) obtained from the shake detector 30 is multiplied by the sensitivity $BLx = 32768$ (LSB/deg) for angle information of the shake detector 21, the product of which is $\theta Bx = 557$ (LSB). When this $\theta Bx$ is converted by the lens microcomputer 20 into the sensitivity of the shake detector 21, the result is $\theta Bx = +0.017$, so the detected angles are prevented from being different. The same applies to angular velocity.

In steps S4 and S5 in FIG. 7, the state of the shake detector is confirmed by the body microcomputer 12, and this is determined from data about the shake detector state listed in FIGS. 13B and 14B. More specifically, the shake detector state (camera side) in FIG. 13B is a state flag showing whether or not the shake detector 30 installed on the camera main body 3 side is operating properly. For example, "0x03" indicates that the shake detector 30 is operating properly in the x and y directions, "0x02" indicates that the shake detector 30 is not operating properly in the x direction, "0x01" indicates that the shake detector 30 is not operating properly in the y direction, and "0x00" indicates that operation of the shake detector 30 is abnormal in both the x and y directions. A signal related to this state is outputted at a specific period from the shake detector 30 to the body microcomputer 12. The above data also apply to the shake detector 21.

As discussed above, with this camera system 1, it is automatically determined whether an image blur correction device is installed in the interchangeable lens 2 or the camera main body 3, or both, and just one shake detector, or just one image blur corrector, is automatically driven. As a result, even when an image blur correction device is installed in the camera main body 3 and the interchangeable lens 2, the image blur correctors can be operated properly, without malfunction.

Fourth Embodiment

In the above embodiments, we described a case in which the image blur corrector 76 and shake detector 30 of the camera main body 3 were selected, or a case in which the image blur corrector 83 and shake detector 21 of the interchangeable lens 2 were selected.

However, when the imaging sensor driver 35 of the image blur corrector 76 is operated, vibration and so forth are generated in the imaging sensor driver 35. When this happens, there is the risk that the shake detector 30 installed in the camera main body 3 will detect the vibration generated in the imaging sensor driver 35, and that this will affect the operation of the image blur corrector 76. The same holds true when image blur correction is performed with the image blur corrector 83 and shake detector 21 of the interchangeable lens 2.

Figure 16:
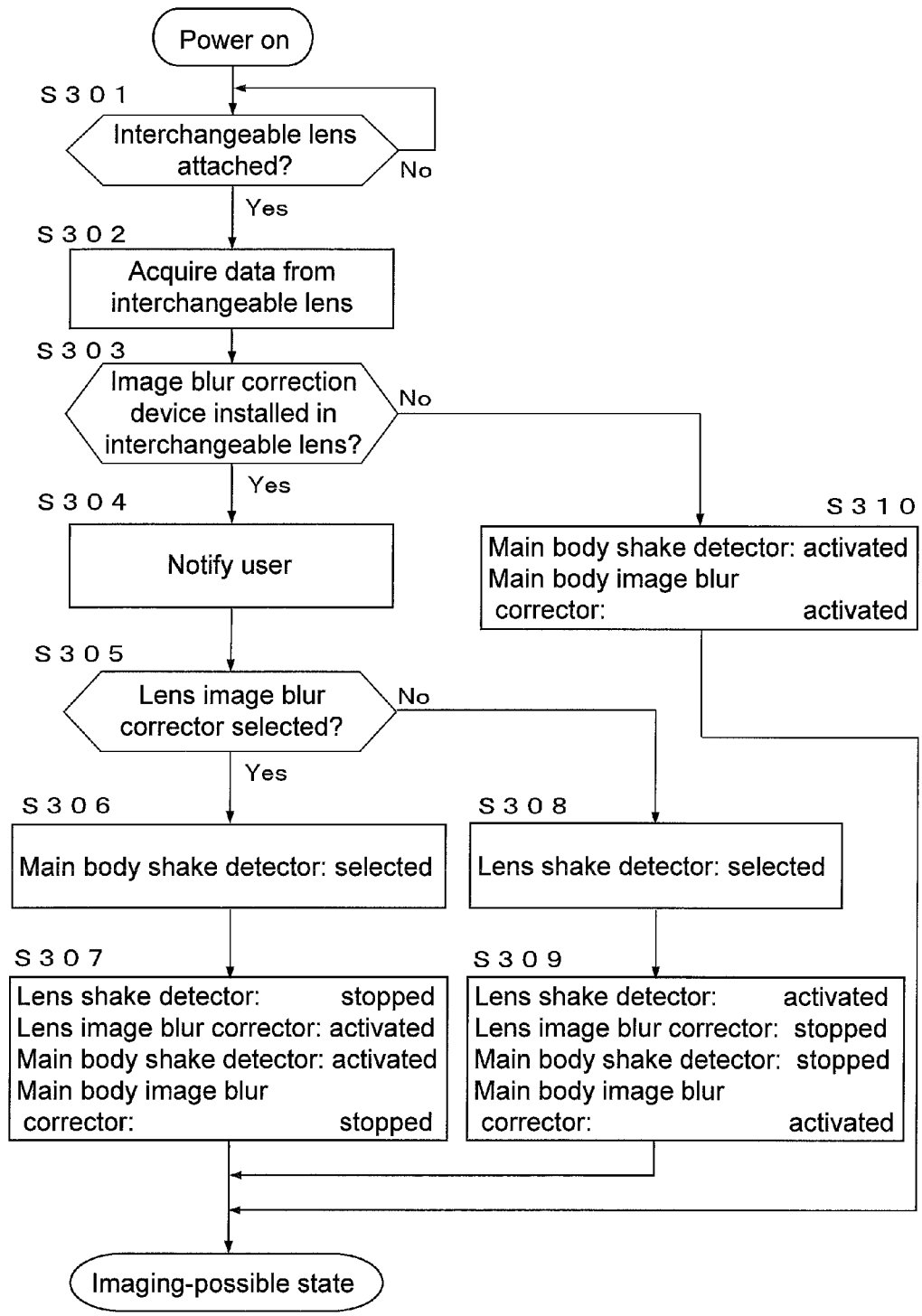
FIG. 16 is a flowchart illustrating the sequence related to the selecting operation of the image blur correction device according to a fourth embodiment of the present invention.

In view of this, a case in which an image blur corrector and shake detector that are separated from one another are selected is also possible. The camera system according to the fourth embodiment of the present invention will be described through reference to FIG. 16. FIG. 16 is a flowchart illustrating the selecting operation of the image blur correction device according to the fourth embodiment of the present invention. Those components that are the same as in the above embodiments will be numbered the same, and will not be described again.

As shown in FIG. 16, when the interchangeable lens 2 is mounted on the camera main body 3, the body microcomputer 12 of the camera main body 3 detects that the interchangeable lens 2 has been mounted (detection step: S301). After the interchangeable lens 2 is mounted, information about whether or not the lens image blur correction device 82 has been installed in the interchangeable lens 2 is acquired by the body microcomputer 12 from the memory component 29 in the interchangeable lens 2 (S302). This information includes information related to whether or not an image blur correction device has been installed, and on the basis of this, the body microcomputer 12 determines whether or not the lens image blur correction device 82 has been installed in the interchangeable lens 2 (selection step: S303). If no image blur correction device has been installed in the interchangeable lens 2, the main body shake detector 30 and image blur corrector 76 are activated (S310).

On the other hand, if the lens image blur correction device 82 has been installed in the interchangeable lens 2, information related to which of the main body image blur corrector 76 and the lens image blur corrector 83 will be used is displayed on the liquid crystal monitor 16 (S304). The user selects one of the image blur correctors 76 and 83 by using the corrector select switch 55 (selection step: S305).

In the selection step, if the image blur corrector 83 has been selected by the user, for example, the main body shake detector 30 is automatically selected by the body microcomputer 12 via the lens microcomputer 20 (S306). As a result, the lens image blur corrector 83 and the main body shake detector 30 are activated by the body microcomputer 12, and the main body image blur corrector 76 and the lens shake detector 21 are stopped (switching step: S307).

When the main body image blur corrector 76 is selected, the lens shake detector 21 is automatically selected by the body microcomputer 12 (S308). As a result, the lens shake detector 21 and the main body image blur corrector 76 are activated by the body microcomputer 12, and the lens image blur corrector 83 and the main body shake detector 30 are stopped (switching step: S309).

Since the shake detector farthest from the selected image blur corrector is thus automatically selected, the shake detector detects less vibration and so forth generated in the image blur corrector. This prevents a decrease in image blur correction performance.

Fifth Embodiment

Figure 17:
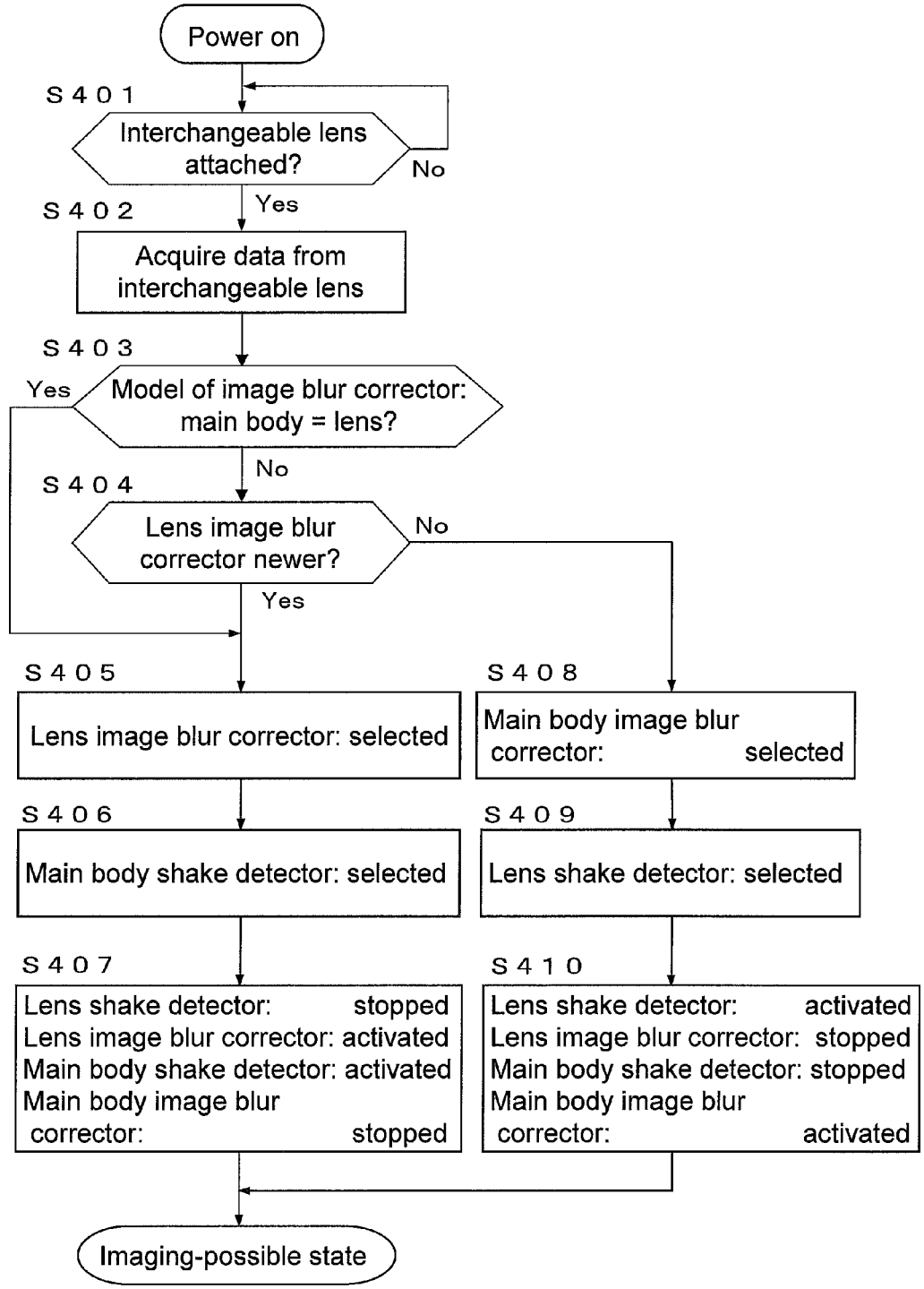
FIG. 17 is a flowchart illustrating the sequence related to the selecting operation of the image blur correction device according to a fifth embodiment of the present invention.

In the fourth embodiment above, the user selects the image blur corrector. However, just as in the third embodiment above, a case in which the image blur corrector is automatically selected on the basis of the specifications of the image blur corrector is also possible. The camera system according to a fifth embodiment of the present invention will be described through reference to FIG. 17. FIG. 17 is a flowchart of the selecting operation of the image blur correction device according to the fifth embodiment of the present invention. Those components that are the same as in the above embodiments will be numbered the same, and will not be described again. Also, we will assume here that the main body image blur correction device 75 has been installed in the camera main body 3, and that the lens image blur correction device 82 has been installed in the interchangeable lens 2.

As shown in FIG. 17, when the interchangeable lens 2 is mounted on the camera main body 3, the body microcomputer 12 of the camera main body 3 detects that the interchangeable lens 2 has been mounted (detection step: S401). After the interchangeable lens 2 is mounted, information about whether or not the lens image blur correction device 82 has been installed in the interchangeable lens 2 is acquired by the body microcomputer 12 from the memory component 29 in the interchangeable lens 2 (S402).

Next, model information (such as manufacture date, model number, etc.) for the image blur correctors 76 and 83 is compared by the body microcomputer 12 on the basis of the main body information and lens information held in the non-volatile memories 53 and 54 or the memory components 29 and 36. For instance, if the models of the image blur correctors 76 and 83 are the same, the predetermined lens image blur corrector 83 is selected, and the main body shake detector 30 farther away from the image blur corrector 83 is selected (selection step: S405, S406). As a result, the lens image blur corrector 83 and the main body shake detector 30 are activated by the body microcomputer 12, and the main body image blur corrector 76 and the lens shake detector 21 are stopped (switching step: S407).

On the other hand, if the models of the image blur correctors 76 and 83 are different, the body microcomputer 12 compares the models of the image blur correctors (S404). If the lens image blur corrector 83 is newer than the main body image blur corrector 76, the body microcomputer 12 selects the newer lens image blur corrector 83, and the main body shake detector 30 farther away from the image blur corrector 83 is selected (S406). As a result, the lens image blur corrector 83 and the main body shake detector 30 are activated, and the main body image blur corrector 76 and the lens shake detector 21 are stopped by the body microcomputer 12 (switching step: S407).

If the main body image blur corrector 76 is newer than the lens image blur corrector 83, the body microcomputer 12 selects the newer main body image blur corrector 76, and selects the lens shake detector 21 that is farther away from the image blur corrector 76 (selection step: S408, S409). As a result, the lens shake detector 21 and the main body image blur corrector 76 are activated by the body microcomputer 12, and the lens image blur corrector 83 and the main body shake detector 30 are stopped (switching step: S410).

Since the shake detector farther away from the selected image blur corrector is thus automatically selected, the shake detector detects less vibration and so forth generated in the image blur corrector. This prevents a decrease in image blur correction performance.

In addition, since the image blur corrector is selected on the basis of main body information and lens information, the newest model of image blur corrector can be used, so the image blur correction performance of the camera system can be utilized to its full potential.

Sixth Embodiment

In the fourth and fifth embodiments above, the image blur correction device 75 (main body image blur corrector 76 and main body shake detector 30) was installed in the camera main body 3, and the image blur correction device 82 (lens image blur corrector 83 and lens shake detector 21) was installed in the interchangeable lens 2.

Figure 18:
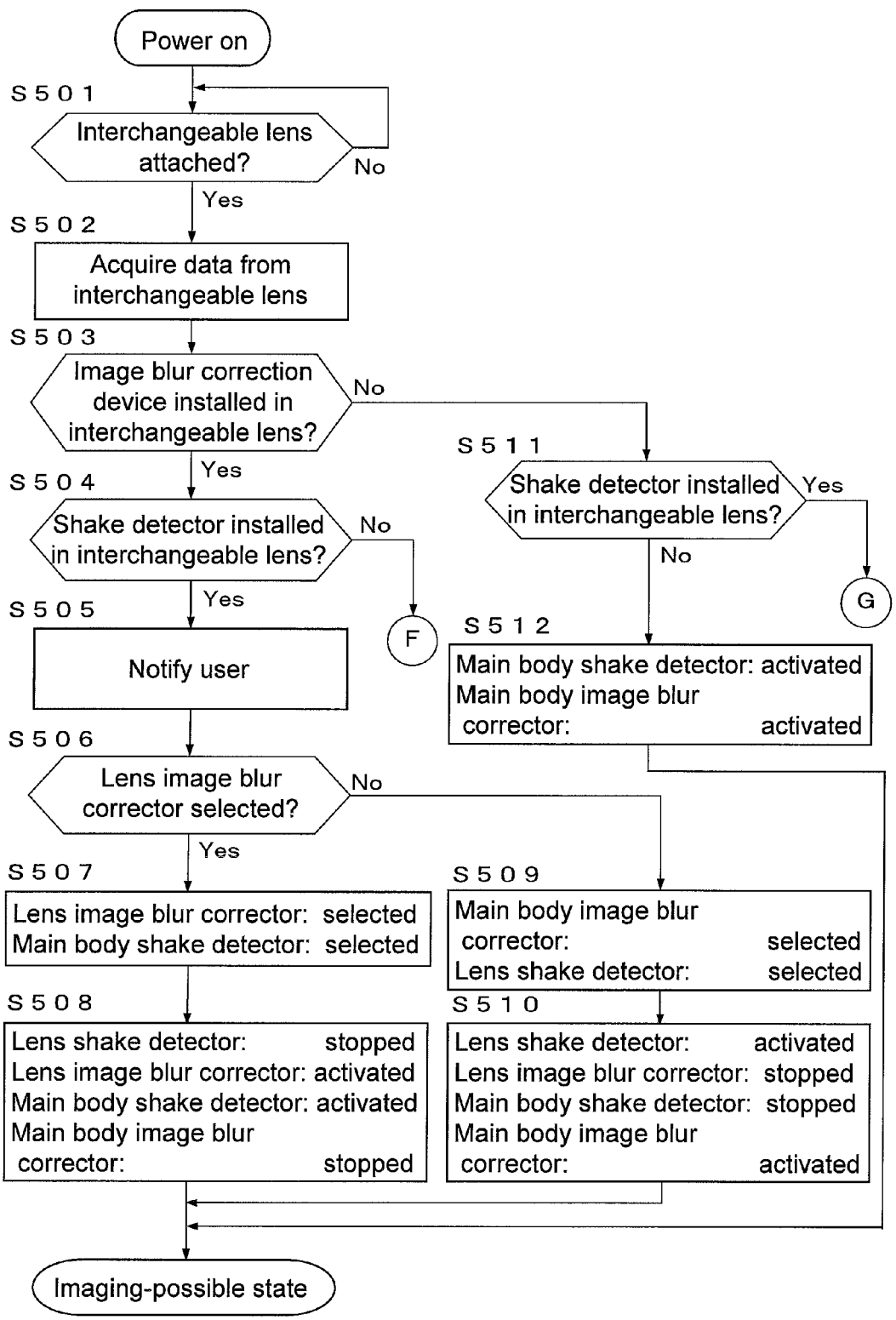
FIG. 18 is a flowchart illustrating the sequence related to the selecting operation of the image blur correction device according to a sixth embodiment of the present invention.
Figure 19:
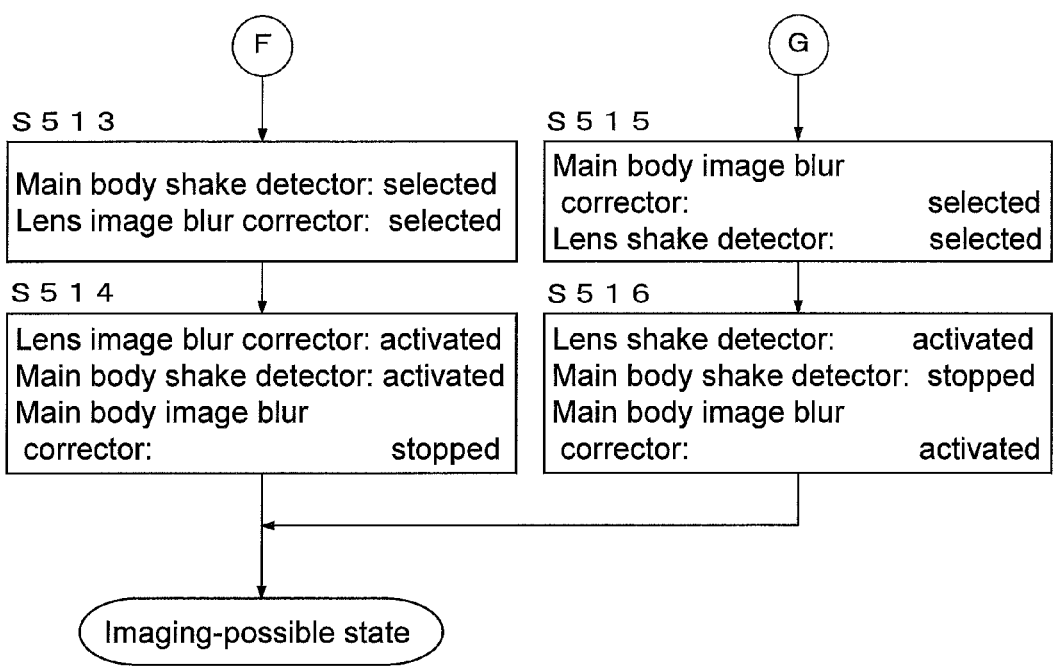
FIG. 19 is a flowchart illustrating the sequence related to the selecting operation of the image blur correction device according to the sixth embodiment of the present invention.

However, a case in which just the image blur corrector or the shake detector is installed is also possible. In this case, the flow shown in FIGS. 18 and 19 is also possible. More specifically, as shown in FIG. 18, when the interchangeable lens 2 is mounted on the camera main body 3, the body microcomputer 12 of the camera main body 3 detects that the interchangeable lens 2 has been mounted (detection step: S501). After the interchangeable lens 2 is mounted, information about whether or not the lens image blur corrector 83 and the lens shake detector 21 have been installed in the interchangeable lens 2 is acquired by the body microcomputer 12 from the memory component 29 in the interchangeable lens 2 (S502). This information includes information related to whether or not an image blur correction device has been installed, and on the basis of this, the body microcomputer 12 determines whether or not the image blur corrector 83 has been installed in the interchangeable lens 2 (S503). Next, the body microcomputer 12 determines whether or not the shake detector 21 has been installed in the interchangeable lens 2 (S504, S511).

If it is determined by the body microcomputer 12 in steps S503 and S504 that an image blur corrector and a shake detector have been installed in the interchangeable lens 2, information related to which of the main body image blur corrector 76 and the lens image blur corrector 83 will be used is displayed on the liquid crystal monitor 16 (S503, S504, S505). The subsequent steps S506 to S510 are the same as steps S305 to S309 in the fourth embodiment above, and therefore will not be described in detail again.

In steps S503 and S504, if it is determined by the body microcomputer 12 that an image blur corrector has been installed in the interchangeable lens 2, but a shake detector has not been installed, the body microcomputer 12 automatically selects the main body shake detector 30, and the lens image blur corrector 83 that is farther away from the shake detector 30 is automatically selected by the body microcomputer 12 (S503, S504, S513). As a result, the lens image blur corrector 83 and the main body shake detector 30 are activated by the body microcomputer 12, and the main body image blur corrector 76 is stopped (S514).

In steps S503 and S511, if the body microcomputer 12 determines that no image blur corrector has been installed in the interchangeable lens 2, but a shake detector has been installed, the main body image blur corrector 76 is automatically selected by the body microcomputer 12, and the lens shake detector 21 that is farther away from the image blur corrector 76 is automatically selected by the body microcomputer 12 (S503, S511, S515). As a result, the lens shake detector 21 and the main body image blur corrector 76 are activated by the body microcomputer 12, and the main body shake detector 30 is stopped (S516).

In steps S503 and S511, if the body microcomputer 12 determines that neither an image blur corrector nor a shake detector has been installed in the interchangeable lens 2, the main body shake detector 30 and image blur corrector 76 are activated by the body microcomputer 12 (S503, S511, S512).

Thus, even when only an image blur corrector or a shake detector, but not both, is installed in the interchangeable lens 2, the image blur corrector and shake detector that are farther away from one another will be automatically selected, so the shake detector detects less vibration and so forth generated in the image blur corrector. This prevents a decrease in image blur correction performance.

Other Embodiments

The specific constitution of the present invention is not limited to or by the above embodiments, and various changes and modifications are possible without departing from the gist of the invention.

(1) For example, automatic selection may be performed according to the photography situation, such as nighttime photography. For instance, the drive style of the image blur corrector may be motor drive or piezoelectric actuator drive, but piezoelectric actuator is quieter. Therefore, in photography situations where the camera system needs to be quiet, such as when the photography mode is switched to silent mode, the constitution may be such that an image blur corrector driven by a piezoelectric actuator is selected. This allows the camera system to be quieter.

(2) The constitution may also be such that the shake detector with the higher detection performance (such as sensitivity) is preferentially selected.

(3) The constitution may also be such that the image blur corrector with the higher correction performance (such as maximum possible correction angle) is preferentially selected.

(4) The constitution may also be such that the shake detector and image blur corrector with lower power consumption are preferentially selected.

(5) The constitution may also be such that automatic selection is performed according to the photography mode, that is, whether an image blur correction unit is always used or only operates when the release button has been pressed.

(6) If we take into account the fact that camera main bodies and interchangeable lenses may differ from one manufacturer to the next, the main body information and lens information may include various kinds of information such as the models of various manufacturers. In this case, the above-mentioned selecting operation can be carried out properly even when the manufacturers are different.

(7) In the fourth and fifth embodiments above, after the image blur corrector was selected by the body microcomputer 12, the shake detector that was farther away from the selected image blur corrector was selected by the body microcomputer 12. However, a case in which the shake detector is selected first is also possible. In this case, after the shake detector has been selected by the body microcomputer 12, the image blur corrector that is farther away from the selected shake detector is selected by the body microcomputer 12. Thus, just as in the fourth and fifth embodiments above, the shake detector detects less vibration and so forth generated in the image blur corrector, so it is possible to improve the image blur correction performance.

Also, in this case, the shake detector may be selected on the basis of specifications as in the fifth embodiment above. Here again the same effect can be obtained as in the fifth embodiment above.

(8) The main body shake detector 30 is not limited to the above-mentioned gyro sensor for detecting rotational speed. For example, the main body shake detector 30 may be a movement vector detection unit for detecting the movement vector from an image signal acquired by the imaging unit 71. In this case, since the movement vector detection unit is installed in the camera main body 3, when the shake detector is selected first, the lens image blur corrector 83 will be automatically selected as the image blur corrector by the body microcomputer 12.

(9) When a moving picture is captured, an image blur corrector that is very quiet may be selected by the body microcomputer 12. In this case, a quieter image blur corrector is selected on the basis of information related to the drive style of the image blur corrector 83 and information related to the drive style of the image blur corrector 76, and the shake detector that is farther away from the selected image blur corrector is selected by the body microcomputer 12.

Also, the selection criteria for the image blur corrector are not limited to those given above. For example, when a moving picture is captured, the lens image blur corrector 83 farther away from a microphone installed in the camera main body 3 may be automatically selected by the body microcomputer 12. In this case, the main body shake detector 30 is automatically selected by the body microcomputer 12. Another possible case is one in which a notice is displayed on the liquid crystal monitor 16 to select the lens image blur corrector 83, and the user selects the image blur corrector. This prevents noise from the drive of the image blur corrector during the capture of moving pictures due to the microphone, and affords quieter operation during the capture of moving pictures.

What is claimed:

1. A camera system for forming an image of a subject, comprising:
    a camera main body having an imaging unit configured to form an image of the subject, a main body shake detector configured to detect shake of the camera system, a main body image blur corrector configured to correct image blur produced by the shake, and a main body controller configured to control the main body shake detector and the main body image blur corrector;
    an interchangeable lens arranged to be removably attachable to the camera main body, having a lens shake detector configured to detect the shake, a lens image blur corrector configured to correct image blur produced by the shake, and a lens controller electrically connected to the main body controller and configured to control the lens shake detector and the lens image blur corrector; and
    a selector;
    wherein the selector selects the lens shake detector when the main body image blur corrector is selected, and selects the main body shake detector when the lens image blur corrector is selected;
    the main body controller holds main body information pertaining to the camera main body;
    the lens controller holds lens information pertaining to the interchangeable lens; and
    the selector is configured to select either the main body or lens image blur corrector on the basis of the main body information and lens information,
    in which the main body information includes main body-side correction performance information pertaining to the correction performance of the main body image blur corrector;
    the lens information includes lens-side correction performance information pertaining to the correction performance of the lens image blur corrector; and
    the selector is configured to select either the main body or lens image blur corrector on the basis of the main body-side and lens-side correction performance information.

2. The camera system according to claim 1,
    wherein the main body information further includes main body-side power consumption information pertaining to the power consumption of the main body image blur corrector,
    the lens information further includes lens-side power consumption information pertaining to the power consumption of the lens image blur corrector, and
    the selector is configured to select either the main body or lens image blur corrector on the basis of the main body-side and lens-side power consumption information.

3. The camera system according to claim 1,
    wherein the main body information further includes main body-side drive style information pertaining to the drive style of the main body image blur corrector,
    the lens information further includes lens-side drive style information pertaining to the drive style of the lens image blur corrector, and
    the selector is configured to select either the main body or lens image blur corrector on the basis of the main body-side and lens-side drive style information.

* * * * *